United States Patent
Boulanger et al.

(10) Patent No.: US 9,335,469 B2
(45) Date of Patent: May 10, 2016

(54) PLANAR OPTICAL BRANCHING CIRCUIT

(75) Inventors: Martin Boulanger, Holte (DK); Yueqiang Shen, Copenhagen OE (DK); Dan Anker Zauner, Copenhagen N (DK)

(73) Assignee: IGNIS PHOTONYX A/S, Rudersdal (DK)

( * ) Notice: Subject to any disclaimer, the term of this patent is extended or adjusted under 35 U.S.C. 154(b) by 771 days.

(21) Appl. No.: 13/363,274

(22) Filed: Jan. 31, 2012

(65) Prior Publication Data
US 2013/0195404 A1    Aug. 1, 2013

(51) Int. Cl.
G02B 6/12 (2006.01)
G02B 6/125 (2006.01)
G02B 6/28 (2006.01)

(52) U.S. Cl.
CPC ............ *G02B 6/12014* (2013.01); *G02B 6/125* (2013.01); *G02B 6/2808* (2013.01)

(58) Field of Classification Search
None
See application file for complete search history.

(56) References Cited

U.S. PATENT DOCUMENTS

| | | | |
|---|---|---|---|
| 5,629,999 A | 5/1997 | Henry et al. | |
| 5,745,618 A | 4/1998 | Li | |
| 6,304,706 B1 * | 10/2001 | Sugita | G02B 6/12011 385/129 |
| 6,807,354 B2 * | 10/2004 | Nakagawa | G02B 6/12011 385/132 |
| 6,888,985 B2 | 5/2005 | Hosoi | |
| 6,920,264 B2 | 7/2005 | Tabuchi | |
| 6,973,236 B2 * | 12/2005 | So | G02B 6/1228 385/37 |
| 2003/0012497 A1 * | 1/2003 | McGreer et al. | 385/37 |
| 2004/0076374 A1 | 4/2004 | Greiner et al. | |
| 2005/0078912 A1 | 4/2005 | Iazikov et al. | |
| 2005/0135748 A1 | 6/2005 | Yamazaki | |
| 2008/0292239 A1 | 11/2008 | Fondeur et al. | |

FOREIGN PATENT DOCUMENTS

| | | |
|---|---|---|
| JP | 2002-014243 A | 1/2002 |
| JP | 2004325865 | 11/2004 |
| WO | 03/100483 A2 | 12/2003 |

OTHER PUBLICATIONS

International Search Report and Written Opinion dated May 15, 2013 as received in Application No. PCT/US2013/024217.
Extended European Search Report in European Application No. 13742897.5, dated Aug. 14, 2015, 7 pgs.

* cited by examiner

*Primary Examiner* — Tina Wong
(74) *Attorney, Agent, or Firm* — Maschoff Brennan

(57) ABSTRACT

Embodiments relate to a branching waveguide circuit where two or more waveguides branch from a main waveguide defining between them an intermediate region ranging from said main waveguide. The intermediate region comprises a plurality of holes of cladding material extending from the top of the core layer into intermediate material, said holes being arranged so that the depth of said holes increases away from said main waveguide with an average slope of the hole depth versus distance to main waveguide. This way, loss due to transition between the main and branching waveguides may be reduced.

32 Claims, 14 Drawing Sheets

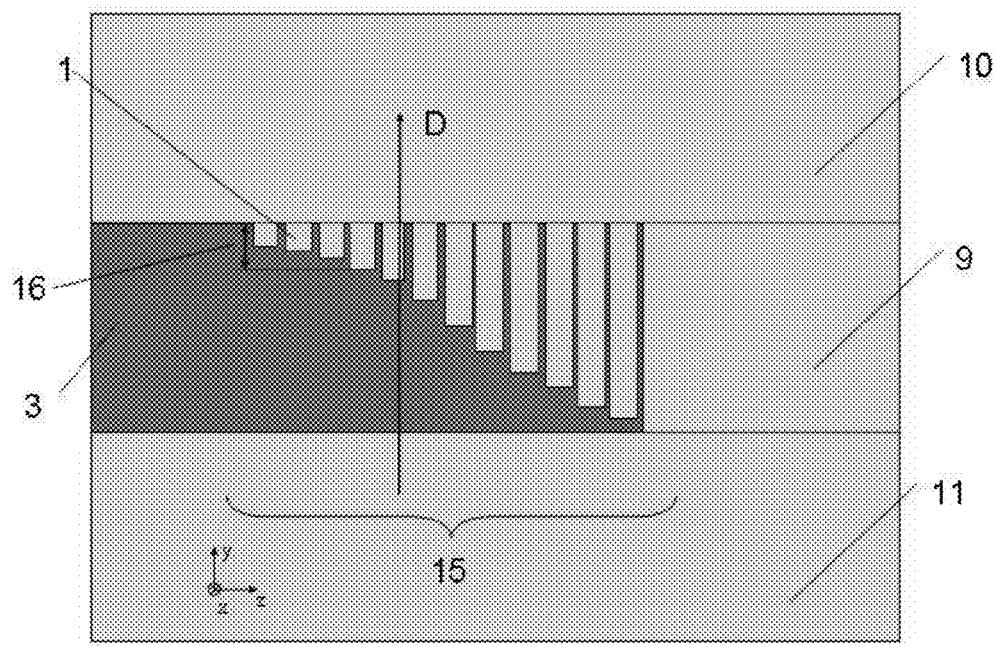
Fig. 3c
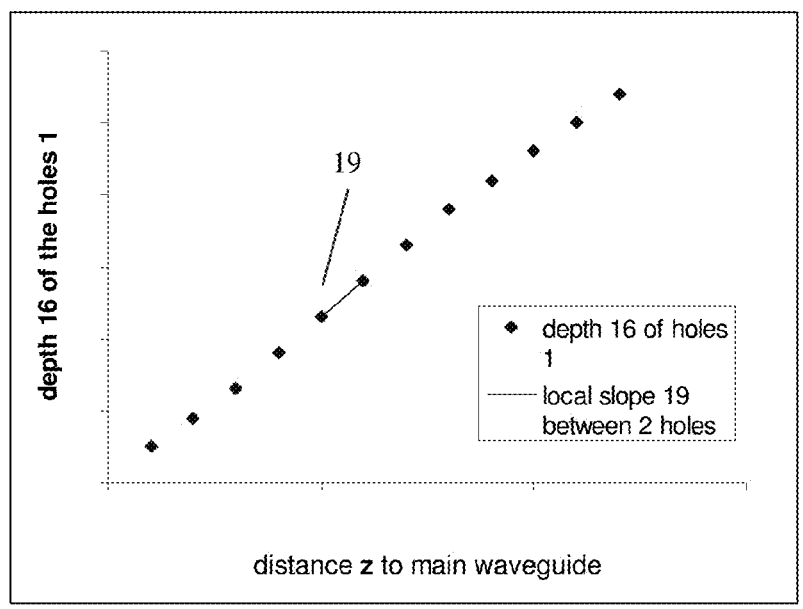
Fig. 3c2

PLANAR OPTICAL BRANCHING CIRCUIT

Embodiments of the present invention relate to planar lightwave circuits and, more particularly, to a planar lightwave circuit having regions sandwiched between a plurality of branching or joining waveguides like a star coupler/splitter or Y-branching waveguide.

BACKGROUND

Conventionally, a planar lightwave circuit formed on a planar substrate can have various functions such as multiplexing/demultiplexing, optical branching, and optical switching. Multi/demultiplexers and optical branching waveguides are important passive parts for applications such as wavelength multiplexing network system and access network.

FIGS. 8 to 10 show an embodiment of a planar lightwave circuit comprising an arrayed-waveguide grating (AWG) multi/demultiplexer well-known in the art. The shown circuit may be implemented using silica glass where silica glass forming waveguides are typically doped to obtain a refractive index which is higher than the surrounding cladding materials. Other materials for forming planar waveguide circuits may also be used such as SiON, LiNbO$_3$, InP, GaAs, InGaAsP, Silicon on insulator, polymers and nano wires which are well-known in the art. The embodiments of the present invention are in principle relevant for implementation in all material suitable for planar optics specifically for any of the above mentioned materials. FIG. 8 shows the arrayed-waveguide grating multi/demultiplexer. FIG. 9 shows part of the arrayed-waveguide grating multi/demultiplexer. FIG. 10 shows part of a cross section taken along a line B-B' in FIG. 9.

As shown in FIG. 8, in this arrayed-waveguide grating multi/demultiplexer, first of all, signal light incident from input waveguides 801 is expanded in an input-side slab waveguide 802 and strikes an arrayed waveguide 803. To simplify referencing a Cartesian coordinate system is applied throughout the present text.

The coordinate system is defined by the optical circuit so that the (x,z) coordinates span the plane of the planar optical circuit and the z-axis is along the direction of light propagation. It is noted that in general when referring to multiple channel waveguides or to an intermediate region between the waveguides, the z-axis refers to the direction of propagation of the combined light distribution in the waveguides rather than the direction of propagation of a mode substantially confined to the individual channel waveguide. In one embodiment, z-axis, in the intermediate region, corresponds to the center line with equal distance to the branching channel waveguides. The combined light distribution from 2 or more waveguides is also sometimes referred to as a super mode in the art. The x-axis then defines the transverse direction also in the plane of the chip and the y-axis defines the dimension normal to the plane of the chip (see e.g. local coordinate systems 810). A measure along the x-axis is referred to as width, along the y-axis as height and along the z-axis as length. In the present text, y=0 is defined at the interface between the lower cladding layer and the core layer. This means that for a core layer of height h, the interface between core layer and top cladding is at y=h. The core layer comprises the 2D planar optical circuit as well a cladding material limiting the waveguide(s) in the transverse direction. The core layer is sandwiched between the lower cladding and the top cladding. The interface between the lower cladding layer and the core layer at y=0 is also referred to as the bottom of the core layer and the interface of the core layer and the top cladding layer at y=h is also referred to as the top of the core layer. Typically, the core material of the waveguides extends from the bottom to the top of the core layer.

A slab waveguide is defined as a waveguide with substantially no confinement of light in the transverse x-direction at least relative to confinement in the individual arrayed waveguides. In the context of the present invention, a slab waveguide has, in one embodiment, a transverse extension (also referred to as the width of the waveguide) of 2 times that of individual waveguides or more, such as 3 times or more, such as 4 times or more, such as 5 times or more, such as 6 times or more, such as 10 times or more. Here, the width of an individual waveguide is measured outside any tapers. In one embodiment, the width is the most minimum width. In the arrayed waveguide 803, since optical path length differences are set between the adjacent waveguides, the signal light which is guided through the arrayed waveguide 803 and incident on an output-side slab waveguide 804 has fixed phase differences between adjacent waveguides in the array. The signal light is therefore focused and demultiplexed by different output waveguides 805 depending on the wavelengths satisfying diffraction conditions.

In the arrayed waveguide 803, as shown in FIGS. 9 and 10, cores 803*a* are clearly separated from each other. In the connection portion between the arrayed waveguide 803 and the input-side slab waveguide 802 or output-side slab waveguide 804, spacings on the μm order are formed between the cores 803*a*. As shown in FIG. 10, each core 803*a* is sandwiched between lower and top cladding layers 806 and 807 made of a material (e.g. silica glass) having a refractive index lower than that of the core 803*a*, thereby forming an optical waveguide.

A challenge for branching devices is loss due to the transition from the main waveguide (i.e. the slab waveguide 802 in the case of the AWG shown in FIG. 8) to the branching waveguides 803. Here the oscillating electro-magnetic field experiences an abrupt change in the refractive index distribution. Generally speaking this transition loss may be reduced if the transition in refractive index is smoothened or made less abrupt.

Between the branching waveguides, spacings in the order of μm are typically formed between the respective cores 803*a* at the intermediate region. The spacings between the respective waveguides at the branching point are ideally zero (0) to minimize transition loss from the spacings between the branching waveguides. However, photolithography and etching techniques used in the process of forming waveguides have their limited resolution, and the spacings between the respective waveguides (cores), e.g., glass-based waveguides, at the branching point are therefore typically about 1 μm or more.

For these reasons, in a conventional planar lightwave circuit, an excess waveguide loss from transition occurs at such a branching portion or combining portion. Demands have therefore arisen for a reduction in transition loss at the portion. Note that while embodiments of the present invention are discussed in relation to waveguides branching waveguides, i.e. light propagation from the main waveguide into the branching waveguides, the invention is also applicable in combining waveguides to a main waveguide. In the context of the present invention the term branching waveguide therefore also refers to a combining waveguide where light propagate in the branching waveguide towards the main waveguide.

U.S. Pat. No. 6,304,706 provides an approach to reducing transition loss at a branching point. Here a buried layer is added in the region between two cores branching from a branching point and the buried layer decreases in thickness as the spacing between the cores increases with an increase in distance from the branching point. FIG. 7a shows that the height of a buried layer 704 extending from a core 703 of a slab waveguide on a lower clad 702 formed on a substrate 701 linearly decreases. In this case, an angle θ of the slope of the buried layer 704 is 0.46°. The refractive index of the buried layer is higher than that of the cladding, and a refractive index of the core is not less than that of the buried layer. In some embodiments the buried layer is made from the same material as the core. FIG. 7b shows the buried layer 420 spaced in between two branching cores 403a in a Y-branching portion such as that discussed in FIG. 4b (FIG. 7 shows the cross section along the line B-B'). The buried layer 704 constitutes a 3D taper of material where the term 3D refers to the tapering of the thickness along the y-axis in contrast to the 2D layout of the planar optical circuit.

The problem of transition loss related to branching waveguides also applies to Y-splitters applied in the 1×8 splitter circuit shown in FIG. 4b. Here signal light is input from the input end of an input waveguide 402 formed on a lower clad 401. This signal light is guided by a waveguide 403 of the Y-branching 1×8 splitter circuit and output from the output end of an output waveguide 404. In an embodiment disclosed by the U.S. Pat. No. 6,304,706 patent, a buried layer 420 is implemented in a Y-branching portion, i.e. the region enclosed with the circle in FIG. 4b made of the same material as that for the core 403a in the region between the two branching cores 403a, as shown in the enlarged view of FIG. 4b. When viewed at, for example, the cross section taken along a line B-B' in FIG. 4a, the buried layer 420 is sandwiched between the two branching cores 403a on the lower clad 401, as shown in FIG. 7b. The upper clad 404 is formed to cover these components.

This prior art solution requires complex lithographic techniques in order to produce the smooth slope of the gradual layer. Also, the transition loss may still be improved.

Accordingly, there is a need for an alternative, simplified and/or improved approach to reducing transition loss in relation to waveguides branching from a waveguide.

SUMMARY

In a disclosed embodiment, a planar optical branching device is provided to reduce the transition loss of light at a branching point of waveguides constituting a planar lightwave circuit and a peripheral portion of the branching point. For example, the branching device includes
a. a planar top cladding layer formed by a top cladding material,
b. a planar lower cladding layer formed by a lower cladding material,
c. a planar core layer immediately between said top cladding and lower cladding layers, wherein waveguides are formed by core material limited by cladding material
d. a pair of branching channel waveguides in said core layer branching from a main waveguide defining between them an intermediate region in the core layer ranging from said main waveguide wherein said intermediate region comprises a plurality of holes filled with cladding material extending from the interface between said top cladding layer and said core layer (i.e. the top of the core layer) into intermediate material having a higher refractive index that the cladding material, said holes being arranged so that the depth of said holes increases away from said main waveguide with an average slope as a function of distance from said main waveguide of less than 10% over at least 30% of said intermediate region.

In the present text the phrase increase away refers to a general trend and does not exclude the possibility that adjacent holes have a constant depth or that the depth of the holes decreases along part of the intermediate region. In one embodiment the slope of less than 10% refers to the increase in depth of said holes (in the intermediate region) away from said main waveguide with an average slope as a function of distance from said main waveguide from the first hole closest to the main to the last hole most distant from the main waveguide. For some embodiments the slope is higher or even lower to provide a smooth transition such as said average slope is less than or equal to 45%, such as less than or equal to 40%, such as less than or equal to 30%, such as less than or equal to 20%, such as less than or equal to 10%, 8%, such as less than or equal to 6%, such as less than or equal to 4%, such as less than or equal to 2%, such as less than or equal to 1.75%, such as less than or equal to 1.5%, such as less than or equal to 1%, such as less than or equal to 0.5%, such as less than or equal to 0.25%, such as less than or equal to 0.15%, such as less than or equal to 0.1%. In one embodiment the holes are applied over a smaller or larger percentage of the intermediate region so that said average slope is over at least 10% of said intermediate region, such as over at least 20% of said intermediate region, such as over at least 30% of said intermediate region, such as over at least 40% of said intermediate region, such as over at least 50% of said intermediate region, such as over at least 60% of said intermediate region, such as over at least 70% of said intermediate region, such as over at least 80% of said intermediate region, such as over at least 90% of said intermediate region, such as over at least 95% of said intermediate region, such as along the entire intermediate region. In one embodiment the remaining part of the intermediate region has a substantially constant height. In one embodiment, a part or all of the remaining intermediate region is sloped similar to that of U.S. Pat. No. 6,304,706 (the contents of which is incorporated herein by reference in its entirety). In one embodiment, a part or all of the remaining intermediate region has no 3D structure. In one embodiment, a part or all of the remaining intermediate region comprises one or more paths intersecting the branching waveguides as described in U.S. Pat. No. 5,745,618 (the contents of which is incorporated herein by reference in its entirety) (see particularly FIGS. 2-8 and the corresponding text) or US 2008/0292239 (the contents of which is incorporated herein by reference in its entirety) (see in particular FIG. 7). In the terminology of U.S. Pat. No. 6,304,706 the intermediate region replaces the buried layer. Instead, a 3D structure is formed by having holes in intermediate material (typically equal to the core material) extending from the top of the core layer towards the bottom of the core layer. The depth of these holes varies as a function of distance from the branching point (see e.g. FIGS. 3b and 3c). As discussed below, the inventors have found that the depth of the holes and the spacing of the holes are in one embodiment relatively simple to manipulate by conventional mask techniques and the invention may therefore provide for extended freedom of design and/or relatively simple production.

If the holes or other structures in core material or intermediate material are sufficiently small, the light interacting with the structure will be substantially unaffected by the individual structure but the light will be affected by the average index. Therefore, in one embodiment of this invention, loss will be improved if the individual structures in the intermediate region such as one or more of the holes 1, ridges 17 and/or full core lengths 14, are shorter than a certain "maximum feature length" in z. These specific features are defined later in the text. The maximum feature length depends on factors such as wavelength, mode size and the threshold set for what is considered a substantially unaffected. A suitable method for optimizing the design of the intermediate region and the device as a whole is computer simulation of beam propagation of the optical device or a subsection thereof. Alternatively an analytical estimate may be derived. The following approach is expected to provide a conservative result so that the actual maximum length is expected to be longer than estimated. To estimate the maximum feature length, a single channel waveguide of a certain width is considered. The maximum feature length is estimated as the maximum length of an interruption in the z-direction for which the mode mismatch loss when the mode re-enters the waveguide after the interruption is below a threshold. The mode mismatch loss is calculated from evaluating the overlap integral between the initial field distribution of the channel waveguide and the field distribution after the radiation during the interruption of a length z. To estimate the length, the interruption is, for simplicity, assumed to be complete in the x axis and negligible in the y axis. For the same length z, any change in waveguide structure suggested by this invention is expected to result in a similar or lesser mode mismatch loss. This change of waveguide structure happens, for example, when there are features in the intermediate region such as one or more of the holes 1, ridges 17 and/or full core lengths 14. In one embodiment there are hundreds of features so the threshold of the mode mismatch loss is set to −0.001 dB. This ensures that the sum of the loss of all these features will not be more than in the order of 0.1 dB. Examples of other suitable thresholds values for the maximum mode mismatch loss include −0.002 dB or −0.003 dB. In one embodiment the intermediate region comprises 10 or more holes, such as 20 or more holes, such as 30 or more holes, such as 40 or more holes, such as 50 or more holes, such as 60 or more holes, such as 70 or more holes, such as 80 or more holes, such as 90 or more holes, such as 100 or more holes, such as 125 or more holes, such as 150 or more holes, such as 175 or more holes, such as 200 or more holes, such as 250 or more holes, such as 300 or more holes, such as 350. Considering the waveguide mode to be Gaussian helps to find an analytical solution for the maximum feature length in z based on the evolution of the width of a Gaussian beam radiation in a material of refractive index n (see Katsunari Okamoto, "Fundamentals of Optical Waveguides", Academic Press (2000), Chapter 2, p. 43, the contents of which is incorporated herein by reference in its entirety):

$$W_1(z) = w_1 \sqrt{1 + \left(\frac{\lambda z}{\pi n w_1^2}\right)^2} \Leftrightarrow \quad (1)$$

$$z = \frac{\pi n w_1^2}{\lambda} \sqrt{\left(\frac{W_1}{w_1}\right)^2 - 1} \quad (2)$$

where $w_1$ is the initial spot size of the field before the interruption (i.e. $w_1$ is the radial distance from the center at which the electric field becomes 1/e of the peak value), along the axis 1, which is any axis where there is unbound radiation, which is the axis x in this case; $\lambda$ is the wavelength, z is the length of propagation; n is the refractive index of the material and $W_1(z)$ is the spot size of the field. In a preferred embodiment, the channel waveguide has dimensions of 6×6 µm with a difference in refractive index between core and cladding material of 0.75%, a refractive index of 1.5 of the material in which there is unbound radiation in the x axis and a wavelength of 1.5 µm. Calculating the fundamental mode field of the waveguide structure with a mode solver and minimizing the overlap integral loss with a Gaussian mode yields a spot size $w_1$ of 3.8 µm. For this spot size, a threshold of −0.001 dB corresponds to an expansion of 2%, so the maximum length is found for $W_1=1.02*w_1$. Using Eq. 2, this leads to an estimated maximum feature length of 10 µm for a wavelength of 1.5 µm and an index of 1.5. It is noted that the estimated maximum length depends on the spot size so that, for example, a larger index difference between cladding and core will lead to a reduced maximum feature length—all else equal.

In one embodiment a percentage of the holes of the intermediate regions are shorter than the maximum feature length, such as 10% or more, such as 25% or more, such as 50% or more, such as 75% or more, such as all of the holes are shorter. In one embodiment these holes are longer than the maximum feature length but no more then 3 times longer, such as no more than 2 times longer, such as no longer than 50% longer, such as no longer than 25% longer. In one embodiment the separation of holes, calculated as the pitch minus the length of the hole, is shorter than the maximum feature length, such as 10% or more, such as 25% or more, such as 50% or more, such as 75% or more, such as all of the separations of holes are shorter. In one embodiment these separations are longer than the maximum feature length but no more then 3 times longer, such as no more than 2 times longer, such as no longer than 50% longer, such as no longer than 25% longer. Here the maximum length is in one embodiment calculated based on Eq. 2 and the initial spot size $w_1$ is determined based on the configuration of the branching waveguides away from intermediate region and the wavelength for which the planar optical device is arranged to operate. In one embodiment the threshold is less than −0.05 dB, such as less than −0.025 dB, such as less than −0.005 dB, such as less than −0.003 dB, such as less than −0.002 dB, such as less than −0.001 dB.

It is also noted that the overall loss may be reduced using larger features such as by providing higher loss per feature but having less features and/or where features interact with a small portion of the light.

In one embodiment at least part of the holes are arranged so the average index as a function of z along the intermediate region is changing slowly so that the absolute value of the rate of average index change vs. z is smaller than the difference between the core and the cladding index over a length of 15 µm (i.e. abs($dn_{average}/dz$)<($n_{core}$−$n_{cladding}$)/15 µm), such as over a length of 20 µm, such as over a length of 50 µm, such as over a length of 75 µm, such as over a length of 100 µm such as over a length of 150 µm, such as over a length of 200 µm. In one embodiment, the average index over x and y directions is the effective index of the fundamental mode of one branching waveguide with an intermediate region on each side on the x-direction. In one embodiment, the average index over x and y directions is the effective index of the fundamental mode of 2 branching waveguides with an intermediate region between them. In one embodiment, the average index over x and y direction is the effective index of the fundamental mode of three branching waveguide with an intermediate region between each branching waveguide. In one embodiment the refractive index average over the y and x direction is averaged over the core layer (in y-direction) and over the intermediate region on the x-direction, i.e. only between branching waveguides. In one embodiment the average index over the x and y directions is calculated over the intermediate region on the x-direction plus one half of each of the branching waveguides. For each method of averaging the index over x and y directions, there is one embodiment where the average index is also averaged in z in a running average along the z-axis where the average is taken on a length equal to the maximum feature length. For each method of averaging the index over x and y directions, there is one embodiment where the average index is also averaged in z in a running average along the z-axis where the average is taken on a length equal to twice the maximum feature length. For each method of averaging the index over x and y directions, there is one embodiment where the average index is also averaged in z in a running average along the z-axis where the average is taken on a length equal to half of the maximum feature length. For each method of averaging the index over x and y directions, there is one embodiment where the average index is also averaged in z in a running average along the z-axis where the average is taken on a length equal to a quarter of the maximum feature length. On one embodiment, said at least a part of the holes are more than 25% of the holes, such as more than 50% of the holes, such as more than 75% of the holes, such as more than 90% of the holes, such as more than 95% of the holes, such as all the holes.

In one embodiment the invention is implemented in a star coupler such as in the transition between a slab waveguide and the grating waveguides of an AWG. In one embodiment, the invention improves the loss of the outer wavelength channels of the AWG's, i.e. the outer waveguides of the waveguides 12 on the side of the star coupler opposite to the slab and grating interface 6, more than the loss of the middle channels/waveguides. In one embodiment this reduces the difference of loss between channels. This kind of uneven improvement between channels has also been observed and described in US 2008/0292239 (see FIG. 6). It is difficult to compare this improvement with the prior art because many design parameters also affect the loss at outer channels. Given the flexibility provided by this invention in both x and y axis, it is expected that the loss at the outer channels can be improved even more than with a 2D structure such as that of US 2008/0292239. For some planar optical products, the insertion loss specification for the product is specified as the loss of the channel with the largest loss. In such a case, the reduction of the loss on the outer channels, which would otherwise be the worst loss channels, may allow a product to pass the loss specification. Therefore, in such an embodiment, the uneven distribution of the improvement of the loss vs. channels is a large advantage, even if the middle channels have only a minimal improvement.

In U.S. Pat. No. 6,304,706, it is mentioned that the loss of an AWG was reduced by 1.5 dB, using a buried layer and special process to obtain a perfectly linear 3D taper between the branching waveguides. In U.S. Pat. No. 5,745,618, it is mentioned that the loss of a star coupler was improved from 0.8 dB to 0.3 dB, i.e. 1.0 dB for an AWG, but with a straightforward process. In one embodiment of the present invention, an improvement in the order of 1.3 dB has been determined. This improvement has been determined on the outer channels of a typical production AWG, i.e. the channels that represent the global loss performance of the AWG in most product specifications. This result was obtained using the same standard process as is used to manufacture AWG's without extra steps.

The main waveguide is the waveguide from which the channel waveguides branch, i.e. the slab waveguide in the case of an AWG (see e.g. 3 in FIG. 1) or the larger waveguide in the case of a Y-splitter/coupler.

As noted above, in the present text, the term branching waveguides also includes embodiments where light from the branching guides are joined in the main waveguide.

The intermediate region is the region between the branching waveguides extending, along the general direction z of light propagation, from one end, where light is guided by the main waveguide to the other end where light is separated into distinct modes (or substantially distinct modes) each guided by one of the branching waveguides. Here, substantially distinct corresponds to the case when less than 5% of the optical energy in the mode guided by one channel waveguide has an overlap with the other channel waveguide. In one embodiment the intermediate region comprises intermediate material, such as core material, and holes along the entire length. In one embodiment only a portion of the intermediate region comprises intermediate material and holes, such as more than 30%, such as more than 40%, such as more than 50%, such as more than 75%, such as more than 90%.

In one embodiment the intermediate region ends when the branching waveguides are completely separated by cladding material in the core layer. As discussed below, in one embodiment, one or more, such as all, of the branching waveguides are tapered in width away from the main waveguide, such as substantially immediately following the intermediate region and/or such as to a width reduced by more than 5%, such as by more than 10%, such as by more than 15%, such as by more than 20%, such as by more than 25%, such as by more than 30%. In one embodiment, the intermediate region ends when the branching waveguides stops tapering, i.e. their widths $A(z)$ reaches a minimum and/or is a constant $A_0$ further away from the main waveguide. Here the terms "minimum" and "constant" disregards variations due to production tolerances. Also, in one embodiment "constant" is interpreted broadly so that a subsequent transition, e.g. to a slab waveguide, is disregarded. In one embodiment the waveguide is considered constant if the width is constant over a distance longer than 50 µm.

In one embodiment, the intermediate region ends when the distance between the branching waveguides (measured between corresponding edges or center to center) is more than 9.1 µm along the x axis. Such as more than 9.25 µm, such as more than 9.5 µm, such as more than 9.75 µm, such as more than 10 µm, such as more than 10.25 µm, such as more than 10.5 µm, such as more than 10.75 µm, such as more than 11 µm, such as more than 11.25, such as more than 11.5 µm, such as more than 11.75 µm, such as more than 12 µm, such as more than 12.5 µm, such as more than 13 µm, such as more than 14 µm, such as more than 16 µm, such as more than 18 µm. In one embodiment the intermediate region ends when the spacing between the branching waveguides is more than 12 µm. In one embodiment the intermediate region ends when the spacing between the branching waveguides has increased by more than 0.1 µm, such as more than 0.2 µm, such as more than 0.3 µm, such as more than 0.4 µm, such as more than 0.5 µm, such as more than 0.6 µm, such as more than 0.7 µm relative to the spacing at the interface to the main waveguide. In one embodiment the distances and spacings between the branching waveguides at which the intermediate region will end is smaller in the case of higher index difference between core and cladding material. In one such embodiment the distances cited refer to a refractive index difference of 0.75%. In one embodiment where the index difference takes a different value a corresponding distance is determined with a mode solver so that there is the same percentage of the light sent in one branching waveguide that would overlap the boundaries of the adjacent branching waveguide as on 0.75% with the distances cited. For example, a distance between branching waveguides of 12 μm with an index difference of 0.75% corresponds to a distance of 9 μm with and index difference of 1.5%.

In one embodiment, the intermediate region ends 700 μm away from the branching point along the z-axis. In one embodiment, the intermediate region ends 500 μm away from the branching point along the z-axis. In one embodiment, the intermediate region ends 250 μm away from the branching point along the z-axis. In one embodiment, the intermediate region ends 150 μm away from the branching point along the z-axis.

The intermediate region is limited by the branching waveguides in the transverse direction (x-axis) as seen from the top, i.e. it is defined by the top of the core material. For embodiments where the core material of the core layer extends to the top of the core layer, the transverse and longitudinal (z) extent of the core layer is therefore defined by the distribution of the core material at the top of the core layer. One end, along the z-direction, of the intermediate region is defined by the interface to the main waveguide (see e.g. axis H in FIG. 12). In one embodiment, the interface between the main waveguide and the intermediate region is located at the z-value bordering to the first hole adjacent to the main waveguide. Similarly, the interface between intermediate region and a branching waveguide in the transverse x direction is defined as the border between core material of the waveguide and a hole or material between two holes. Material between two holes is defined as the intermediate and/or core material which can be intersected by at least one straight line from the group of possible lines connecting a point in one of the holes hole to a point in the other hole. In one embodiment the intermediate material is different from the core material and the branching waveguides and the intermediate region are defined by the interface between these materials.

The distance between two waveguides are, in one embodiment, measured as a center to center distance in the (x,z)-plane at the top of the cladding layer.

The depth of a hole is, in one embodiment, defined as the distance between the top of the core layer and a local minimum in the surface defined by the interface between cladding material and the intermediate material. For a hole not connected to other holes the local minimum corresponds to the minimum y-value of the intermediate material for values of (x,z) represented in the hole. In one embodiment the largest area of the hole in the (x,z) plane is found at the top of the core layer.

Typically, the bottom of the intermediate material in a hole will be concave or substantially flat. However, in one embodiment the bottom of the holes are convex, i.e. bulges upwards. In one such embodiment the depth of the holes is still defined as difference between the height of the core layer and the minimum y-value whereas in another embodiment the depth is defined as difference between the height of the core layer and the local y-value maximum at or near the center of the hole. In one embodiment, the depth of the hole is defined as the distance measured along the y axis between the top of the core layer and the height of the intermediate material at the center of the hole, the center of the hole being identified by one or more boundaries between cladding material in the hole and the core material of the branching waveguides or intermediate material in the (x,z)-plane. In one embodiment these boundaries define a shape (typically part of a circle or ellipse) defining a center. This is illustrated in FIG. 5e where the boundaries 25 of the connected hole 1 define the ellipse 24. In one embodiment the center is determined from a circle and/or ellipse best fitting the boundaries. In one such embodiment, these boundaries are identified at the top of the core layer as can be seen in FIG. 5e. In one embodiment, they are identified at a height level with one of the branching waveguides. In one embodiment, they are identified at a lower height above the minimum height in the hole.

DETAILED DESCRIPTION OF EXAMPLE EMBODIMENTS

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

Figure 3A:
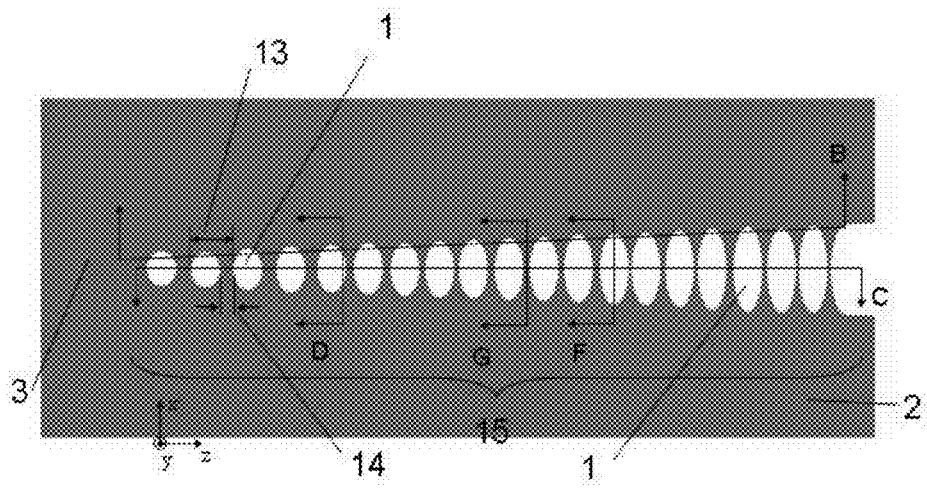
FIG. 3a shows a top view of an intermediate region according to an embodiment.
Figure 3B:
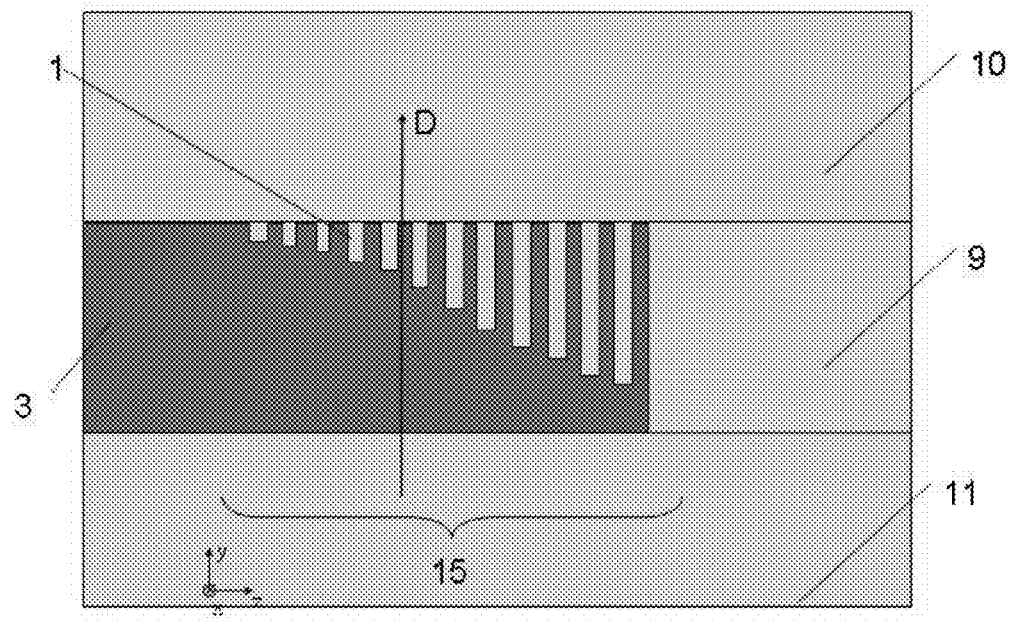
FIGS. 3b-3d show cross sections along the lines B, C and D indicated in 3a, respectively.
Figure 3D:
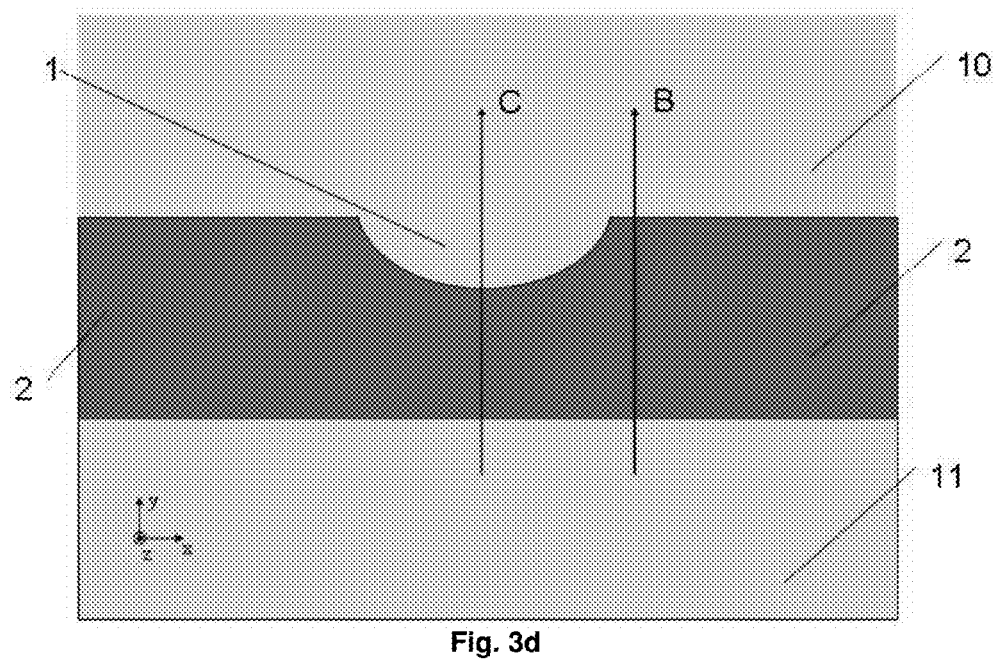
Figure 3E:
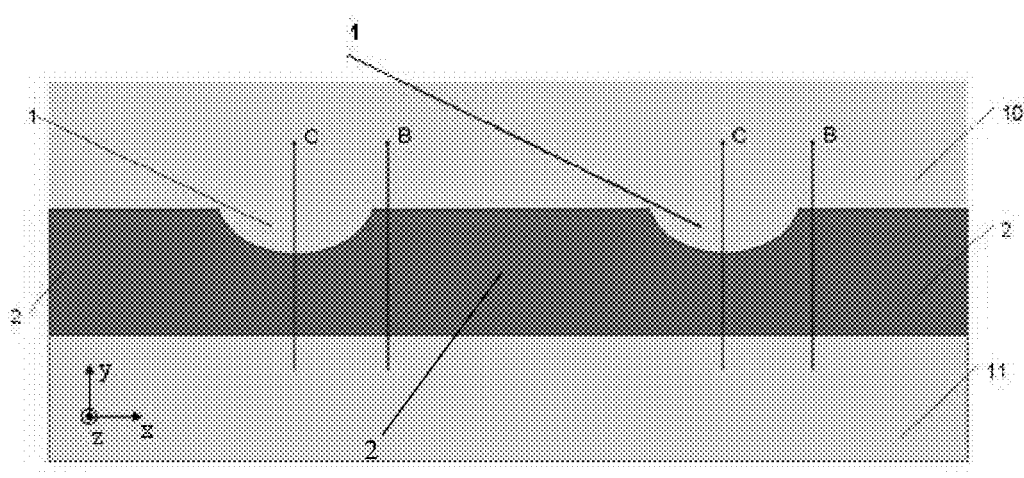
Figure 4A:
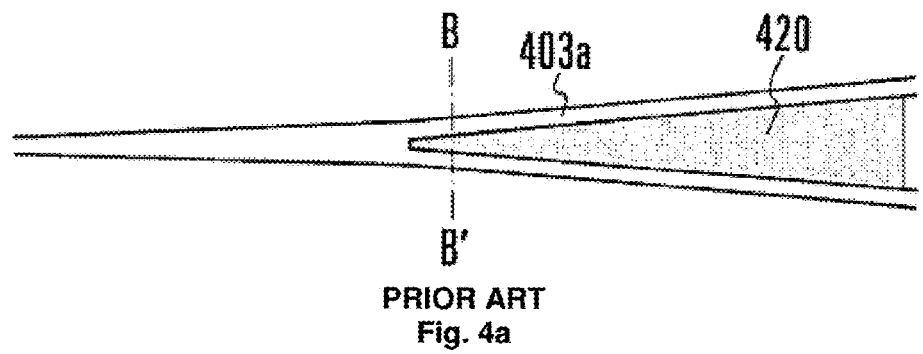
Figure 4B:
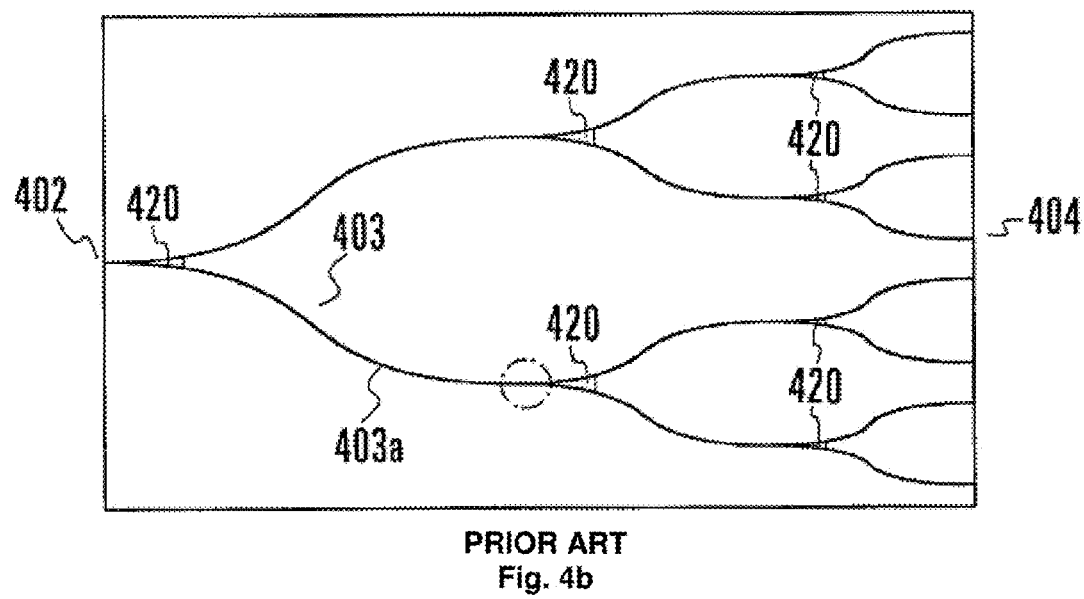
Figure 5A:
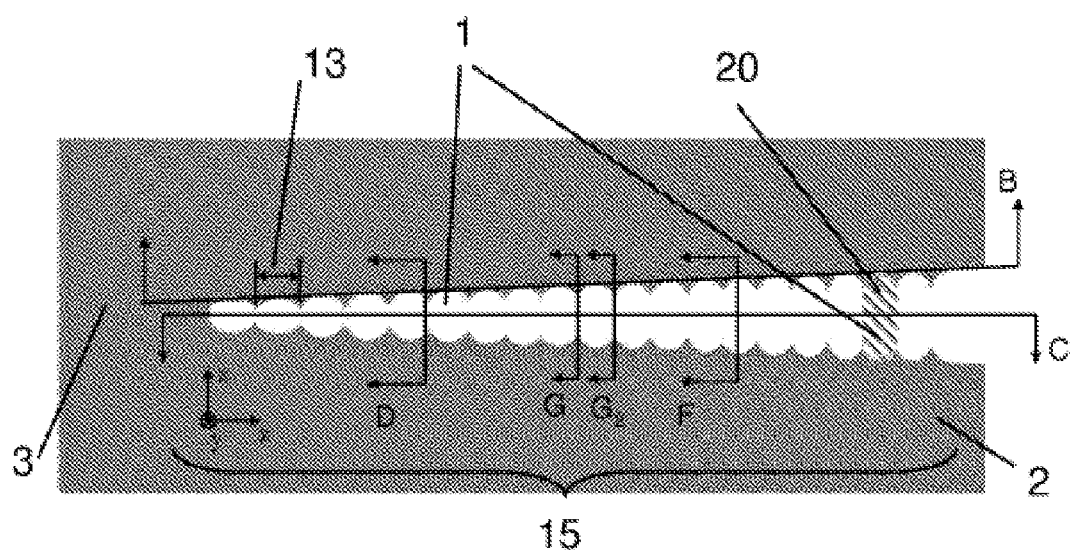
Figure 5C:
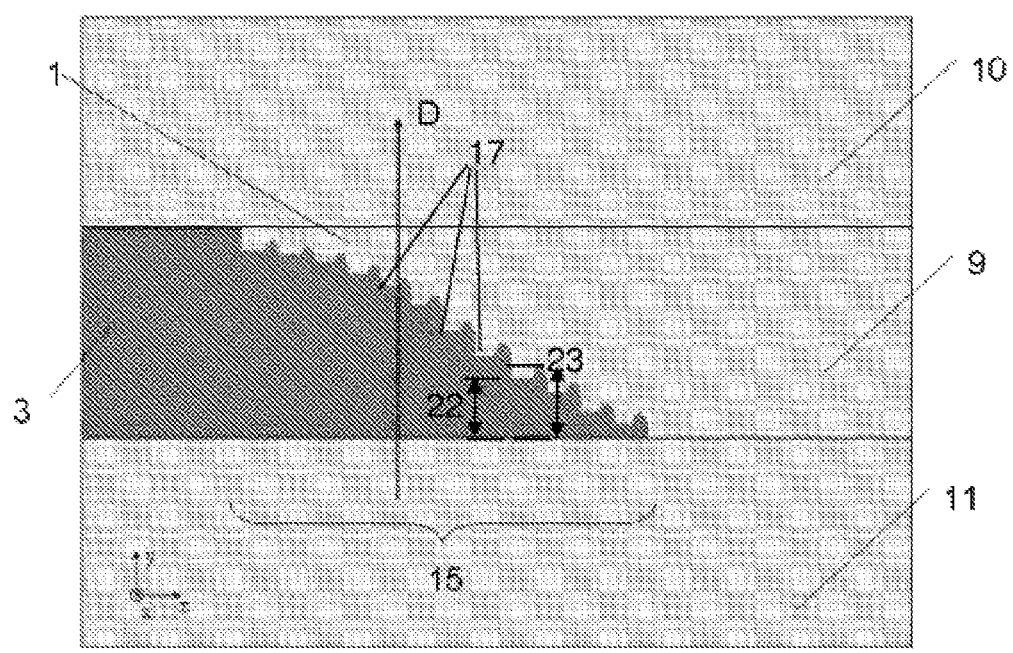
Figure 5E:
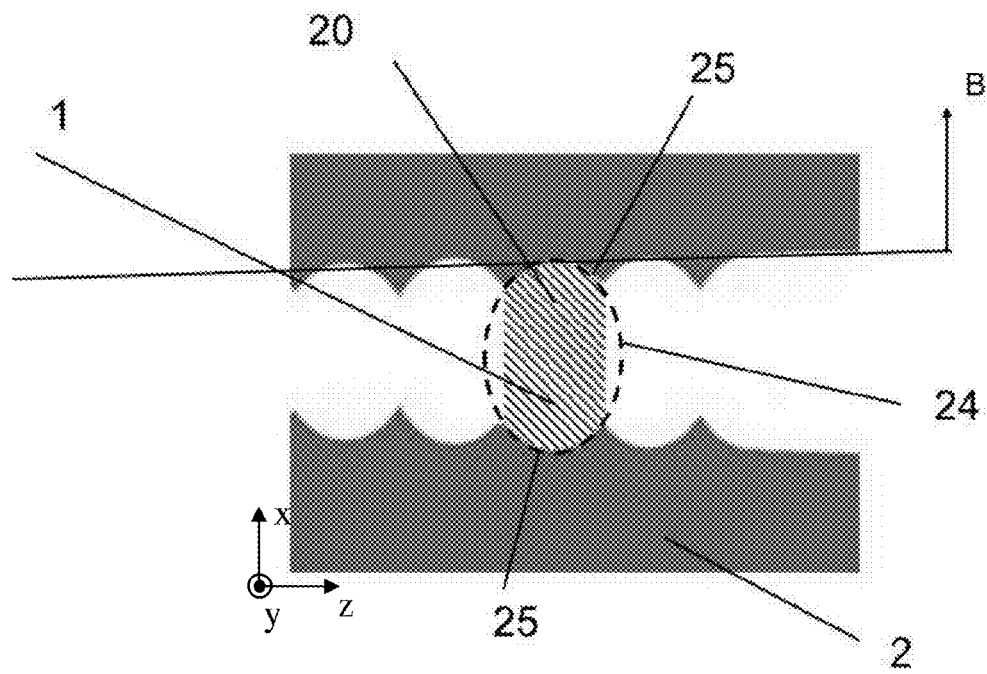
Figure 6:
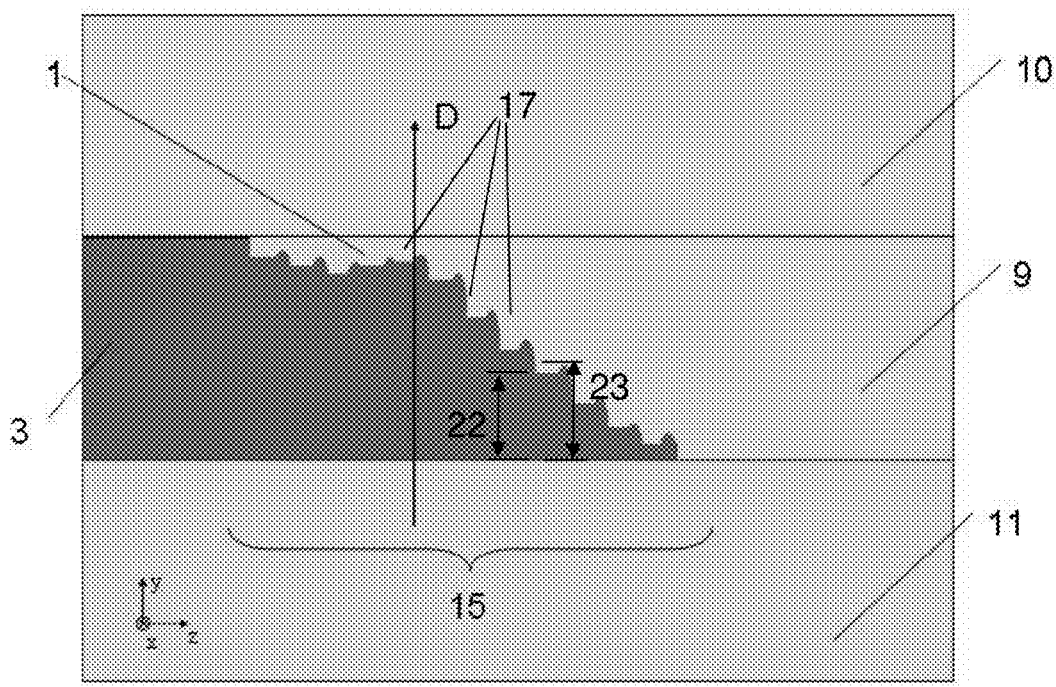
Figure 7A:
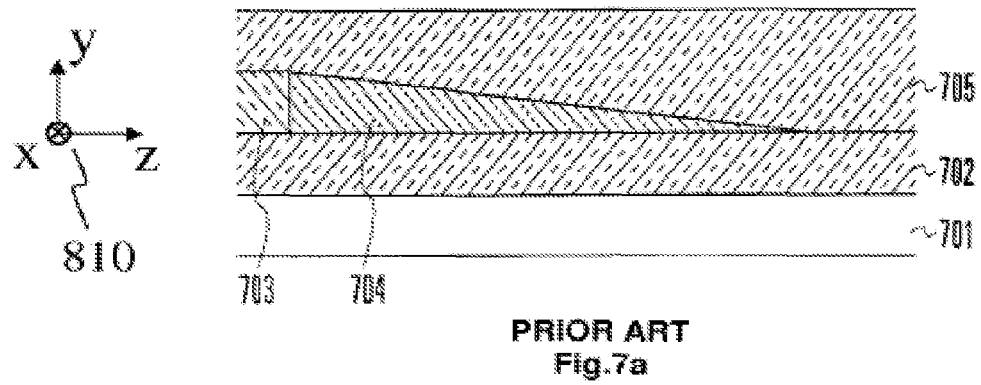
Figure 7B:
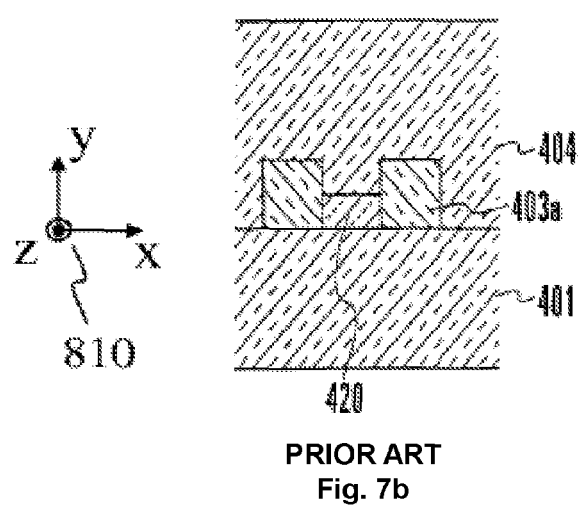
Figure 8:
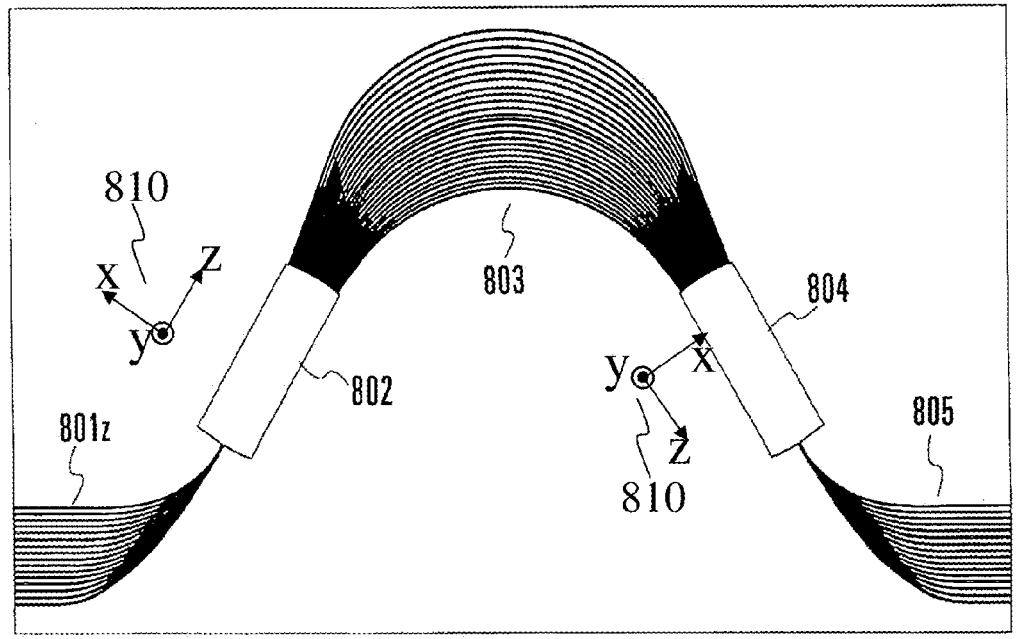
Figure 9:
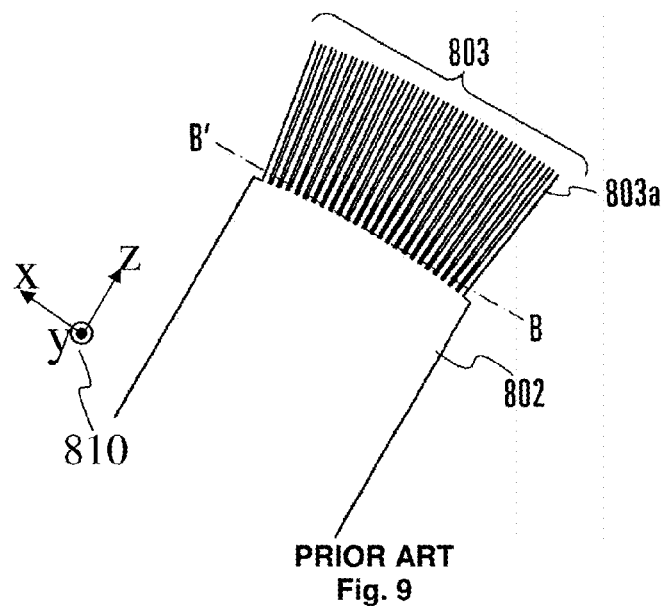
Figure 10:
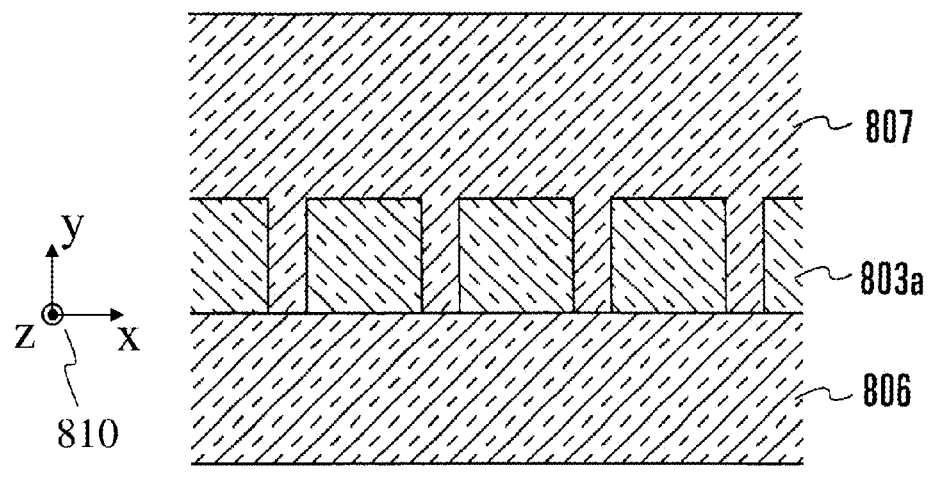
Figure 11:
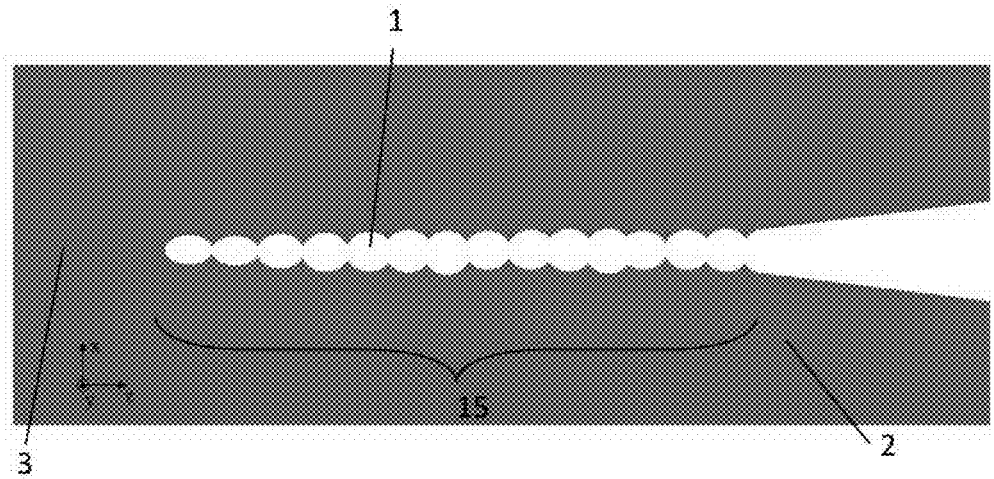
Figure 12:
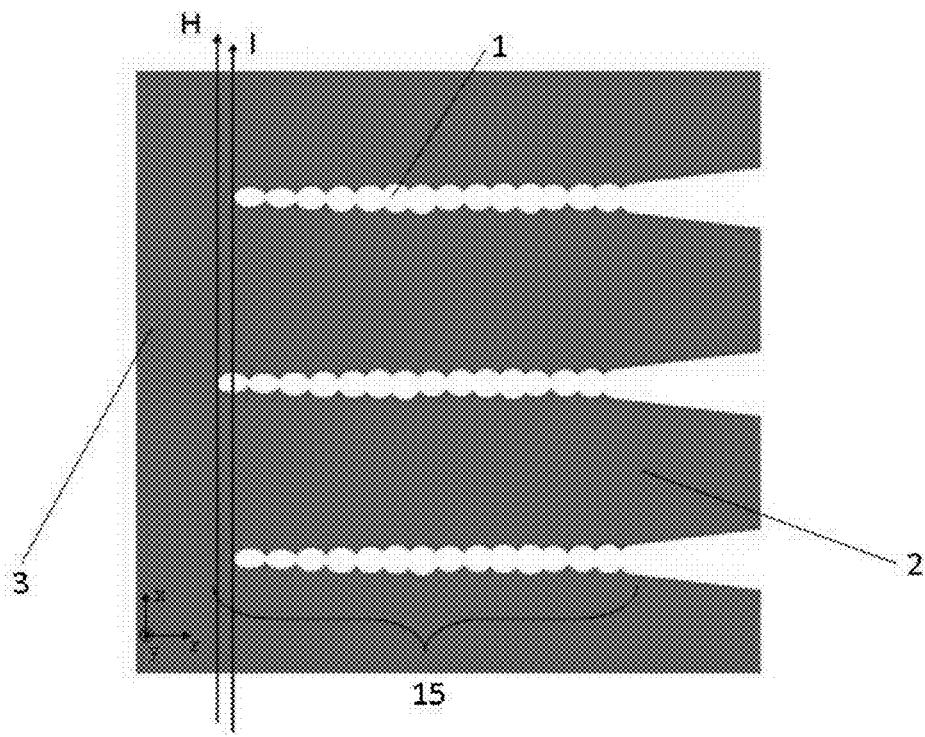
Figure 13:
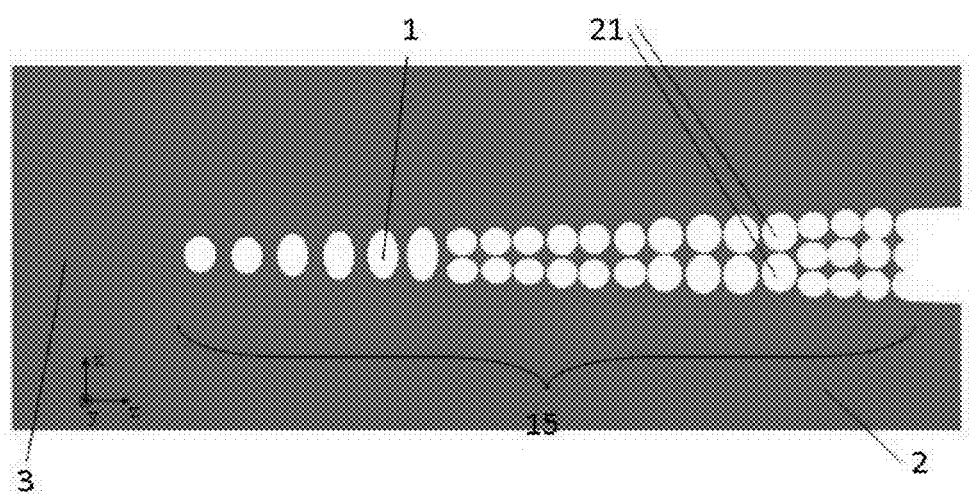

FIG. 3c2 shows the depth of the holes of along the line C;

FIG. 3e shows a view of the cross section shown in FIG. 3d for an embodiment implemented between three or more branching waveguides;

FIG. 4 shows examples of a prior art y-splitter (4a) and a 1×8 splitter (4b);

FIG. 5 shows an embodiment where the holes are connected;

FIG. 5a shows a top view of an intermediate region according to an embodiment;

FIG. 5c shows the cross sections along the line C indicated in 5a;

FIG. 5e shows a zoomed part of FIG. 5a around the indication of the area of the hole 20 in non-connected holes, illustrating an ellipse 24 best fitting the boundaries 25 of a hole;

FIG. 6 shows an embodiment illustrating that the invention encompasses embodiments where two or more adjacent holes have substantially the same height and/or where two or more adjacent holes have a decreasing depth as function of distance to the main waveguide;

FIG. 7 shows a prior art solution;

FIG. 8 shows a prior art AWG;

FIG. 9 shows a part of the prior art AWG of FIG. 8;

FIG. 10 shows part of a cross section taken along a line B-B' in FIG. 9;

FIG. 11 shows an embodiment where the width of the branching waveguides are tapered so the width increases along the z-axis;

FIG. 12 shows an embodiment where more than two waveguides are branched from the main waveguide and the start of the intermediate regions are shifted between adjacent waveguides;

FIG. 13 shows an embodiment with multiple holes arranged along the x-axis; and

Figure 14A:
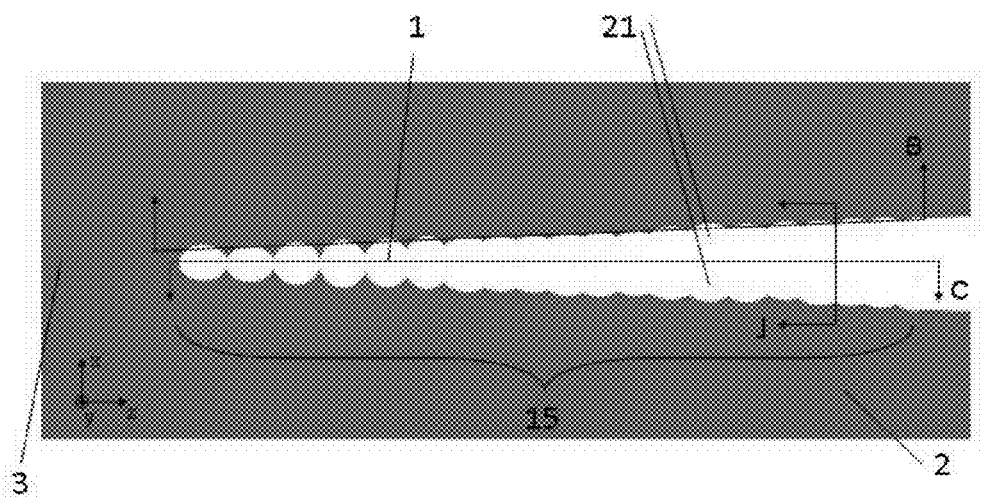
Figure 14B:
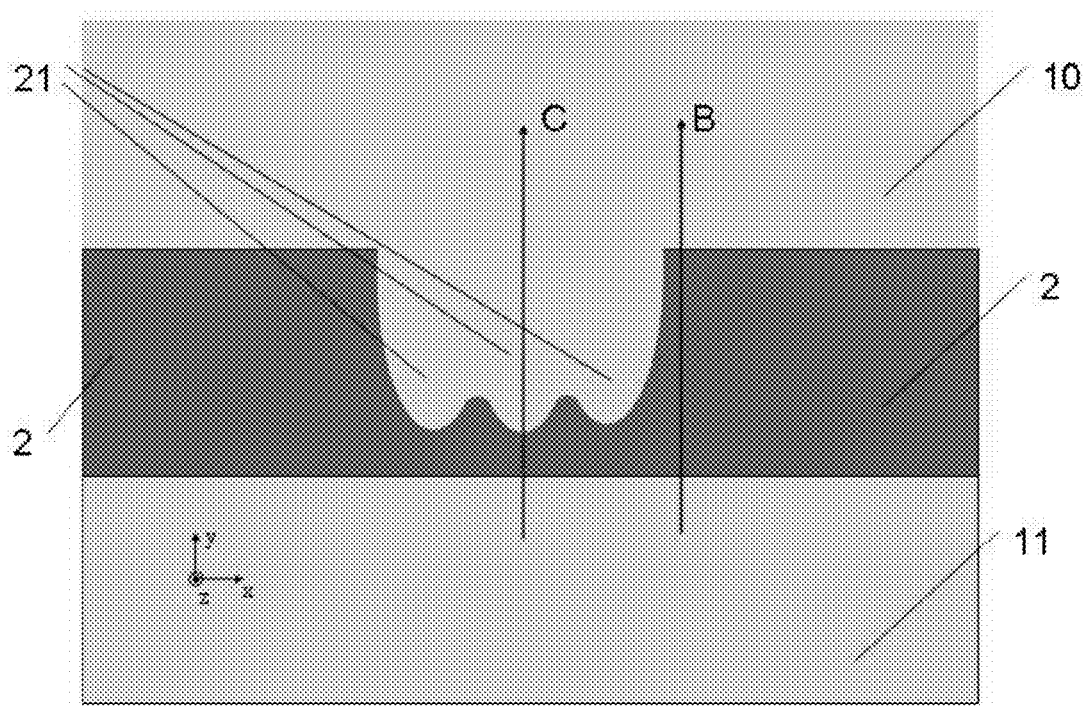

FIGS. 14a-14b show an embodiment with multiple connected holes arranged along the x-axis, where FIG. 14a is a top view and FIG. 14b shows a cross section along the line J;

The figures are schematic and were simplified for clarity. Throughout, the same reference numerals are used for identical or corresponding parts.

Throughout the following the invention is discussion in relation to an embodiment where the intermediate material is identical to the core material; however, the invention is not limited to such an embodiment. In one embodiment the material below, around and/or between the holes may be made from intermediate material different from the core material of the waveguides. In one embodiment the intermediate has a higher index of refraction relative to the cladding material. In one embodiment the intermediate material varies along the intermediate region. The waveguides as well as the holes are in one embodiment provided by depositing a layer of core material on the lower cladding, subsequently applying a lithographic technique to apply a mask arranged to define the waveguide circuit in core material as well as the holes in the intermediate region. However, it is clear to a skilled person that many variations are possible. For example: alternative materials may be applied for the intermediate region, e.g. by depositing such materials after etching the waveguide circuit, the waveguide circuit itself may have a 3D structure and so forth. Figures showing a drawing of sections of the (x,z)-plane show distribution of the core material at the top of the core layer, i.e. at the interface between the core layer and the top cladding. Accordingly, holes shown in this plane do not necessarily extend to the bottom of the core layer. Note that the intermediate material is identical to the core material in the present embodiment.

Figure 1A:
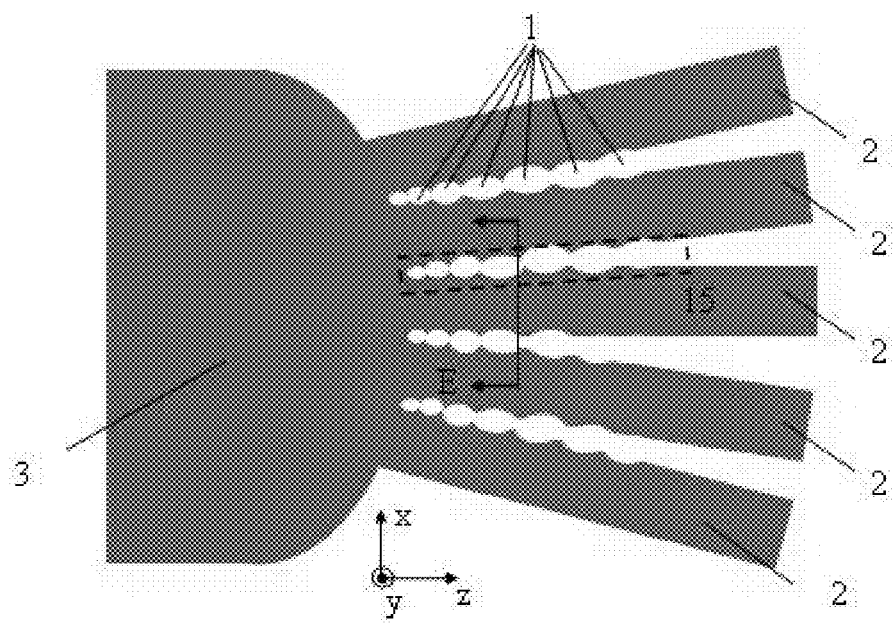
FIG. 1a shows one embodiment implemented in a junction between a main waveguide and 5 branching waveguides.
Figure 1B:
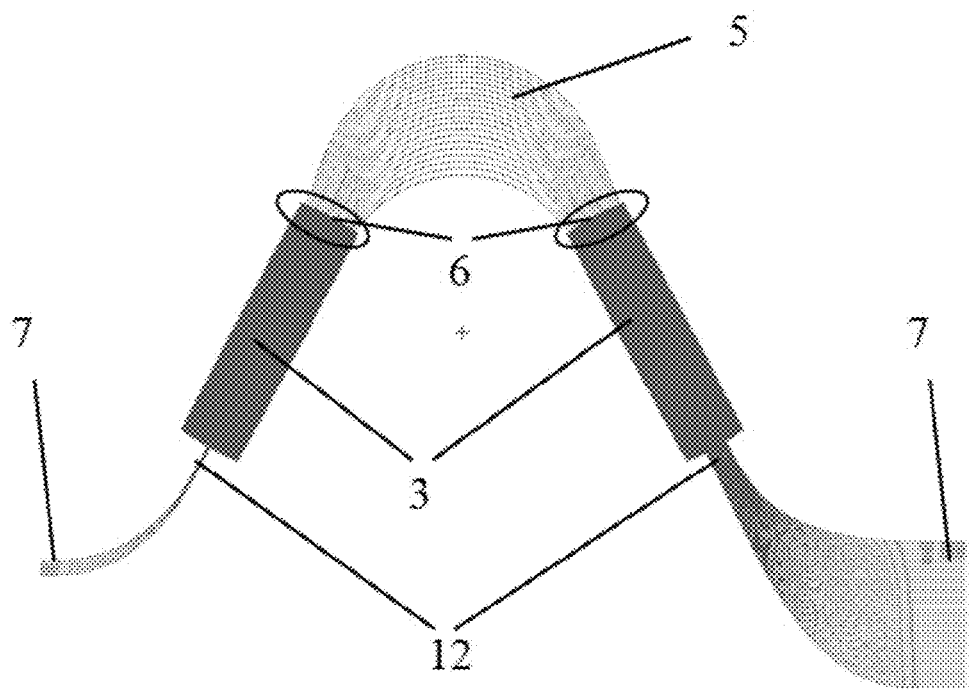
FIG. 1b shows an Arrayed Waveguide Grating (AWG) and its different parts.

FIG. 1a shows one embodiment implemented in the transition from a slab waveguide 3 to channel waveguides 5 for example in an AWG. In one embodiment, the transition of FIG. 1a is implemented in either or both of the circled areas designated 6 of an AWG as shown in FIG. 1b. Here, the main waveguide 3 discussed above corresponds to the slab waveguide. Channel waveguides 2 branch from the slab 3. Slabs and channel waveguides are made of core index layers, which is what is dark on FIG. 1a. The intermediate region 15 comprises the holes 1. The holes are filled with cladding material, i.e. material that has a lower optical index of refraction than the core material. The holes may be provided in various ways discussed further below.

FIG. 1b shows an Arrayed Waveguide Grating (AWG) and its different parts similarly to FIG. 8. The grating section 5 consists of many channel waveguides with different lengths. The inputs and outputs of the AWG at the entrance of the first slab and exit of the last slab, are designated 12. The interface between the slab and the grating is designated 6. The combination of a slab 3, input/output waveguides 12 and a slab interface 6 may also be referred to as a Star Coupler. A star coupler is a part of the AWG where there is significant insertion loss. The present invention is particularly expected to enable reduced transition loss in sections 6 and may also be applied at the input/output sections 12.

Figure 2A:
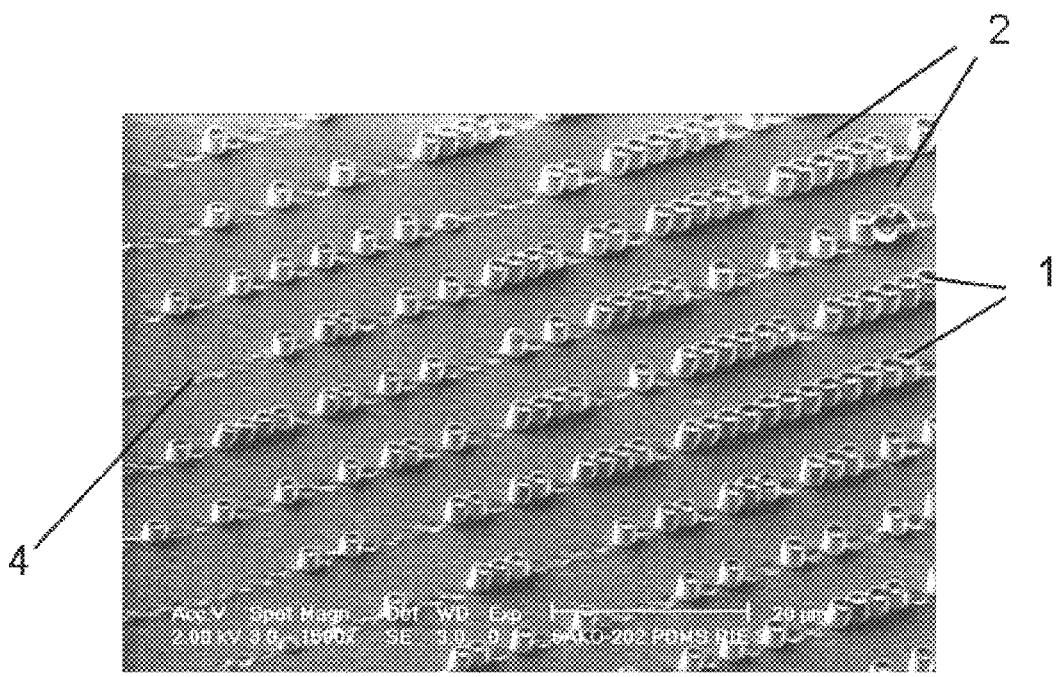
FIGS. 2a-2b show scanning electron microscope pictures of 3D imprints of the holes according to one embodiment.
Figure 2B:
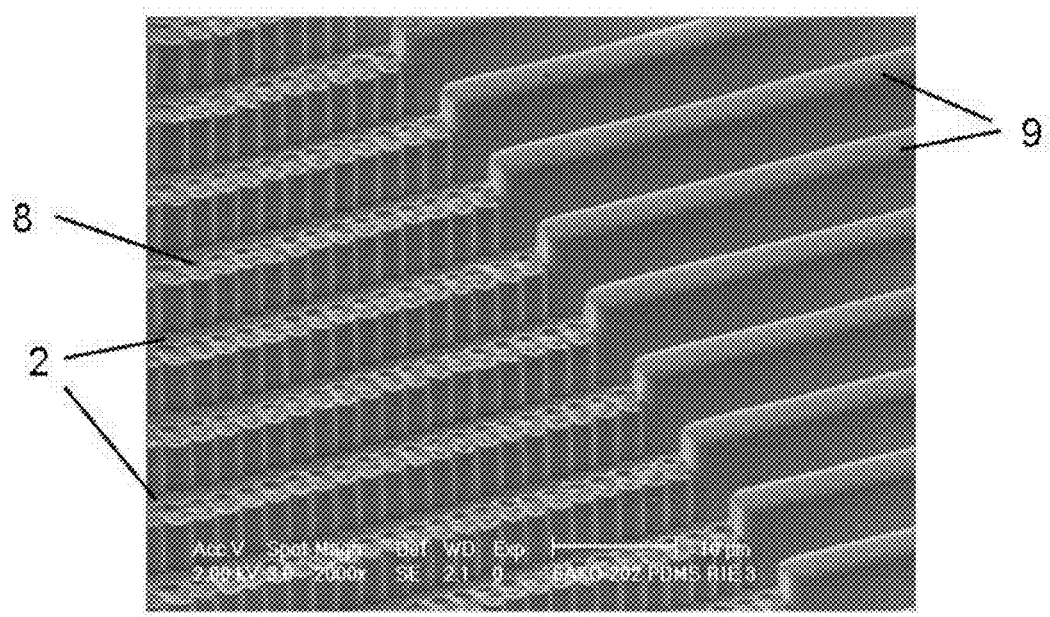

FIGS. 2a and 2b are scanning electron microscope pictures of a 3D imprint of the holes in the junction showed in FIG. 1a. The imprint was made before depositing top cladding material, which otherwise would fill the holes in the core layer and generate the top cladding layer, i.e. on a intermediate product of the planar circuit. The imprint material, e.g. polydimethylsiloxane (PDMS), was then removed. It represents a negative image of the 3D structure of the waveguide circuit. The holes 1 in FIG. 2a show up as pillars of various heights and widths. In this embodiment, the pillars, i.e. holes, are not connected. The height of the channel waveguides 2 sets the bottom of the imprint. Some of the pillars, 4, are missing on the imprint in FIG. 2a. These pillars likely fell off when the imprint material was removed from the wafer. In FIG. 2b the connected pillars 8 correspond to connected holes, i.e. the pillars are joined at least along a part of the depth (see. e.g. discussion of FIGS. 3c and 5c). Via connecting, it is possible to vary how long or wide the hole effectively is. If the holes are connected along almost the whole depth of their common interface, then there will be almost no core area between two holes. That makes the connected holes effectively like a single long hole; however, in one embodiment the depth of the hole depends on the area of the hole so that connecting individual holes can provide a longer/wider hole with a lower depth than the corresponding single large hole. The rectangular extensions 9 correspond to the end of the intermediate region where the channel waveguides are complete separated by cladding material. In one embodiment, the extensions are higher than the pillars because, in this embodiment, the holes do not reach the bottom of the core layer. In another embodiment, the holes reach the bottom of the core layer. It is noted that in a standard branching from a main waveguide without measures to reduce transition loss, the rectangular extensions would extend to the main waveguide.

FIG. 3a shows a schematic top view of (one row) of the intermediate region corresponding to FIG. 2a. A dark color corresponds to core material whereas a white correspond to cladding material. As can be seen in FIG. 2a, none of the holes 1 are connected in this embodiment. The cross section along B is shown in FIG. 3b while the cross section along C is shown in FIG. 3c. The axis shown as C is also referred to as center axis of the intermediate region. The cross section along D shown in FIG. 3d, which can also be identified on FIGS. 3b and 3c, shows a cross section of a hole off center.

FIGS. 3b and 3c show the cross sections along B and C, respectively. In cross sections showing the (y,z)- or (x,y)-planes dark color correspond to core material and lighter color correspond to cladding material. The core layer is sandwiched between the top cladding 10 and the lower cladding 11. In FIGS. 3b and 3c, the core material extend from the bottom cladding to the top cladding between the holes because the holes are not connected in the intermediate region 15. Due to the increasing depth 16 of the holes 1, an effective reduction in core material in the vertical (y) direction is provided in the transition between the main waveguide 3 and the channel waveguides. Since the residual core material between the holes may be designed to be relatively short such as with a length in z shorter than the maximum feature length defined in equation 2 above, the light will, in one embodiment, be substantially undisturbed by the residual core material between the holes (i.e. substantially no scattering) but will instead experience an average reduction of the refractive index along the z-axis. Accordingly, the holes will in one embodiment improve transition loss. This will particularly be the case when the distance between the holes along the center axis of the intermediate region (or at least part thereof) is less than the maximum feature length defined in equation 2 above.

The pitch of the holes is in one embodiment defined as the center to center distance between two holes along the z axis. The determination of the center of a connected hole is discussed above. Alternatively, the pitch may be measured as the distance from first edge to first edge 13. In one embodiment, this corresponds to the distance from a first line G between a first hole and a second hole to a second line $G_2$ separating the second hole and a third hole. In one such embodiment the pitch correspond to the length of the second hole. The line G between two holes is in one embodiment defined as a straight line coinciding with a local minimum in the distance between intermediate and/or core material across the intermediate region in an (x,z) plane in a view from above (see FIG. 5a). In one embodiment where the core material of the waveguides reaches a height y=h, the said (x,z) plane is the plane defined by (x,z,h). Typically the height h is equal to thickness of the corer layer so the (x,z) plane is along the top of the core layer. In one embodiment the intermediate material and/or core material of the intermediate region has a general lower height in which case the (x,z) plane is in one embodiment defined at this height.

Accordingly, in one embodiment the pitch is equal to or less than 18 microns over at least a part of the intermediate region, such as equal to or less than 15 microns, such as equal to or less than 10 microns, such as equal to or less than 8 microns, such as equal to or less than 6 microns, such as equal to or less than 4 microns, such as equal to or less than 3 microns, such as equal to or less than 2.8 microns, such as equal to or less than 2.6 microns, such as equal to or less than 2.4 microns, such as equal to or less than 2.2 microns, such as equal to or less than 2 microns, such as equal to or less than 1.8 microns, such as equal to or less than 1.6 microns, such as equal to or less than 1.4 microns. Here, "at least a part of" is, in one embodiment, more than 10% of the intermediate region, such as more than 25%, such as more than 50%, such as more than 75%, such as more than 80%, such as more than 90%, such as more than 95%, such as 100%.

In one embodiment it may be preferable to have increased core material between the holes closer to the main waveguide to provide an effectively adiabatic decrease in core material away from the main waveguide, so that the pitch toward the main waveguide is more than 1.25 microns, such as more than 2 microns, such as more than 2.25 microns, such as more than 2.5 microns, such as more than 3 microns, such as more than 5 microns, such as more than 10 microns. Depending on the hole size, a shorter pitch may provide connected holes while a larger pitch may provide connected holes, see e.g. the embodiment of FIG. 5. In one embodiment connected and non-connected holes are applied in combination. In one such an embodiment non-connected holes are applied closer to the main waveguide and connected holes further away to provide an adiabatic reduction in core material away from the slab. In another embodiment, the connected holes are applied closer to the main waveguide and the non-connected holes are applied further away. In such a case, the transition from connected holes to non-connected holes could require a substantial increase in hole depth to provide an effectively adiabatic average refractive index. In one embodiment the slope at such a juncture is more than 10%, such as more than 20%, such as more than 30%, such as more than 40%, such as more than 50%.

In the case of non-connected holes, it is often preferable that the length of intermediate material 14, in this case core material, reaching the top of the core layer between the holes is relatively narrow to avoid scattering from these spacings. This length is referred to as the "full core length". A duty cycle of the hole pattern is defined as the ratio of the full core length in z between two adjacent holes 14 divided by the pitch 13 along the center axis of the intermediate region or the z-axis. In one embodiment the duty cycle vary along the intermediate region. For example, increased residual full core length between holes closer to the main waveguide provides for a higher duty cycle closer to the main waveguide. The duty cycle is 0 for holes connected along the z-axis and is in one embodiment preferable relatively low for non-connected holes. In one embodiment the duty cycle of the intermediate region is less than 40%, such as less than 30%, such as less than 20%, such as less than 10%, such as less than 5% such as zero along the entire intermediate region.

FIG. 3c2 shows the depth of the holes of FIG. 3c plotted as function of distance from the main waveguide. The local slope 19 defined by two holes is defined as the difference in depth divided by the spacing between the holes. In one embodiment the spacing between two holes are measured between minimum heights. In one embodiment the spacing is measured center to center.

FIG. 3d illustrates that in one embodiment the shape of the hole 1 may provide a smooth transition along the transverse axis x where there is slowly less core in the middle of the hole relative to closer to the branching waveguides. In one embodiment this effect contributes to reduced transition loss in the branching from the main waveguide 3 to the branching waveguides 2. FIG. 3e shows a zoomed out view of the cross section shown in FIG. 3d for an embodiment where the branching waveguides are part of a star coupler/AWG. This allows three channel waveguides 2 to be shown FIG. 5a and 5c show corresponding cross sections as FIG. 3a and 3c for an embodiment with connected holes 1 as shown in FIG. 2b. The area of a hole at the top of core layer is shown by marking 20. It is the area delimited by the edges of the oval at the top and bottom on FIG. 5a. towards the channels waveguides and by the intersection with the adjacent holes (such as along G) along the propagation axis z. As will be discussed further below, the depth of the holes is in one embodiment substantially determined by the area as seen from the top.

The embodiment of FIGS. 5a and 5c has cross sections in the (y,z)-plane and the (x,y)-plane that will appear substantially identical to those of FIGS. 3b and 3d, although with other dimensions, and which cross sections have been omitted for brevity. A cross section along B will show the core material between holes reaching the top similarly to FIG. 3b. However, the cross section along C shown in FIG. 5c shows that the spacing between the holes 1 are reduced to a ridge or wall 17 below the height of the core. In one embodiment these ridges contribute to the average refractive index along the z-direction and/or provide a smooth slope of the core material in the x-direction similarly to the shape of the hole shown in FIG. 3d. In this way the ridges between the holes will in one embodiment contribute to reduced transition loss. With the holes connected, it may be said that the thickness of core material varies substantially step-wise, reducing as the holes are further away from the main waveguide along the z-axis. Similarly to FIG. 3c the depth of the holes decreases monotonically as a function of distance to the main waveguide 3. The slope of the increased depth is in one embodiment as discussed above.

In the embodiment of FIG. 6, two or more adjacent holes have substantially the same height and the depth also decreases along part of the intermediate region. This illustrates that while the depth of the holes increases away from said main waveguide with an average slope the depth is, in one embodiment, constant and/or decreasing along the intermediate region as a function of the distance to the main waveguide 3. Accordingly, in this embodiment, the slope is negative and/or zero along a part of the intermediate region.

FIG. 11 shows an embodiment where the channel waveguides further comprise a tapering in the transverse direction (x) following the intermediate region, i.e. as a function of the distance from the main waveguide 3, i.e. along the z-axis. In the embodiment of FIG. 11, the tapering in the transverse direction (x) following the intermediate region is reducing the width of the channel waveguide 2, such as to a width reduced by more than 5%, such as by more than 10%, such as by more than 15%, such as by more than 20%, such as by more than 25%, such as by more than 30%. For example, when this embodiment is implemented in an AWG one or more (such as all) of the waveguides are tapered down between the intermediate region 15 and the grating area 5. Typically, lengths of the waveguides are increasing in a roughly linear way from bottom to top waveguide in the grating area 5 which provides wavelength dispersion vs. position, which is used to filter the wavelengths. In the present embodiment both waveguides 2 taper but it may in principle only be one of the waveguides. In other embodiments such tapering down may be combined with a part or the entire intermediate region. In one embodiment, one or both of the channel waveguides next to the intermediate region comprises a taper which is increasing the width of the channel waveguide 2 as it gets farther from the main waveguide along at least part of the intermediate region. In FIG. 11 the part of the channel waveguides 2 along the intermediate region has a taper increasing the width of the channel waveguides 2 as a function of distance to the main waveguide. This may be controlled by the dimensions of the holes in the transverse direction i.e. along the x-axis. In this embodiment, the holes have the same width, even when the distance between the waveguides 2, center to center, increases as the waveguides get further away from the main waveguide. The width of the channel waveguides 2 will be tapered up if the width of the holes is constant or even decreases since there is increasing separation of the waveguides along the z-axis. As discussed below, the depth of the holes are, in one embodiment, substantially controlled via the area of the holes. Accordingly, the transverse width of the holes may, in one embodiment, be tuned to obtain tapering of the waveguides 2 whereas the length of the holes may be tuned to obtain an area suitable to provide an increased depth of the holes as a function of z. Therefore, in one embodiment the intermediate region comprises holes having a ratio of length to width along $(z_{max}/x_{max})$ less than 2, such as less than or equal to 1.8, such as less than or equal to 1.6, such as less than or equal to 1.4, such as less than or equal to 1.2, such as less than or equal to 1, such as less than or equal to 0.9, such as less than or equal to 0.8, such as less than or equal to 0.7, such as less than or equal to 0.6, such as less than or equal to 0.5, such as less than or equal to 0.4, such as less than or equal to 0.3, such as less than or equal to 0.2, such as less than or equal to 0.1, such as less than or equal to 0.05. In one embodiment there are more than 20 holes with said ratio, such as more than 40 holes, such as more than 60 holes, such as more than 80 holes, such as more than 100 holes. The definition of boundary between the intermediate region and the branching waveguides was discussed above. The width of the holes is determined from these boundaries. For example, in one embodiment the width of the holes increases with distance to the main waveguide, such as by 0.3 μm or more, such as by 0.6 μm or more, such as by 0.9 μm or more, such as 1.2 μm or more, such as 1.5 μm or more, such as by 2 μm or more, such as by 3 μm or more, such as by 4 μm or more, such as by 5 μm or more. In FIG. 11 the width of the holes varies up and/or down as a function of distance to the main waveguide in order to tailor the depth of the holes and at the same time adjust the shape of the core material along the x axis (see e.g. FIGS. 3.*d* and 3.*e*) which depend on the width of the holes.

FIG. 12 represents an example of the invention on an AWG where the first hole, i.e. closest to the main waveguide, is not at the same z position between all channel waveguides 2. In this figure, the closest hole to the main waveguide 3 between the second and third channels from the bottom is starting on the axis H here referred to position z=0. However, the closest hole to the main waveguide between the first and second, and between the third and fourth channel waveguides, is starting on the axis I, which is half a pitch 13 away from the main waveguide 3 relative to H. The slow effective transition of the invention allows starting the separation between channel waveguides 2 at different positions. This allows a slightly smoother transition from the main waveguide to the super mode of the intermediate region 15 as there will be more core in the region between the axis H and I relative to the case where H and I are coinciding. Although a shift of half a pitch is shown in FIG. 12 other values of the shift are contemplated such as a shift from 5-95% of a pitch, such as shift from 10-90% of a shift, such as shift between 15-85%. Also, in one embodiment, the branching waveguides in a star coupler are shifted in z-position as a function of x, such as according to a Sine-function as a function of x. In one embodiment the shift embodiment the branching waveguides in a star coupler are shifted in z-position as randomly within an interval, such as between 0% and 100% of a pitch, such as between 0% and 50% of a pitch, such as between 0% and 25% of a pitch.

FIG. 13 shows an example of the invention where multiple holes 21 are provided in the transverse direction. This allows control of the vertical tapering in the x axis with multiple holes in the same way as it is done in previous examples in the z axis. In one embodiment this allows for control of depth of the holes via the area of the holes while controlling the separation of the branching waveguides substantially independently of the area of the holes. For the x axis, the distances between the edges of the channel waveguides 2 is typically small especially close to the main waveguide 3. Therefore, the x axis tapering will not offer as many options close to the main waveguide as far from it since the quantity of holes in axis x is more limited there. In FIG. 13 the holes of each row (i.e. substantially same z-position) have substantially identical size. However, in one embodiment the holes vary in size. For example a row of three may comprise a larger center hole so that the center hole is deeper and the depth profile in the row therefore provides a more adiabatic separation of the two waveguides relative to that of a single large hole (see also FIG. 14*b*). In one embodiment the larger area of one or more of the holes in a row is provided by extending the larger hole in the x-direction to allow for a substantially constant width of the row. In one embodiment multiple holes in the transverse direction are applied while shifting these holes in the z-direction i.e. the holes are no longer in rows.

FIG. 14 is an example of an intermediate region with multiple holes along the x axis between two adjacent channel waveguides 2 similar to FIG. 13. However, in this example the holes are connected. Accordingly, the boundary around the center holes along the top of the core layer have been etched away however sufficient boundary was present on the mask to leave intermediate material underneath (see FIG. 14*b*). Accordingly, in one embodiment, governing the area of each small hole allows to determine the depth of the holes and therefore the profile in the (x,y)-plane as can be seen in FIG. 14*b*. FIG. 14*b* is a cross section along J in FIG. 14*a*. This shows an example of profile that can be obtained across the x axis when three holes 21 are arranged in a row at a given z position between two channel waveguides. In the present example the depth of the holes is the same for the three holes 21. However, as discussed above, it is possible, by choosing the area of each of the holes on the mask, to obtain a desired shape of the intermediate material (in this case core material) along the x axis between the waveguides. For example, the middle hole could be made deeper in order to drive the light to the channel waveguides 2. In another example, the middle hole could be made less deep in order to catch part of the light in between the channel waveguides.

Provision of Holes

In one embodiment the holes are provided via 2D mask design, such as via the same mask used to define the waveguides. Typically, one mask followed by a suitable etch, such as Reactive Ion Etch (RIE), is applied to define the waveguide circuit of the chip. In this embodiment, the holes implementation is possible without adding wafer processing steps.

In one embodiment, to obtain a hole, a corresponding opening is provided in the mask. In this discussion, an opening in the mask means an opening in the protective layer on the wafer before etching. It could be obtained by using positive photoresist where there are also openings on the photomask or it could be obtained using negative photoresist where the openings obtained on the protective layer on the wafer before etching come from closed structures on the photomask which has an opposite design. Depending on the subsequent etch process the opening is designed taking any linewidth reduction into consideration i.e. the size and shape of the opening is designed to provide the resulting hole shape, size and depth profile. This means that the opening may be smaller or larger than the resulting hole and that the shape may be different. As noted above, the depth of the holes is, in one embodiment, substantially determined by the area as seen from the top. This area, in turn, corresponds to the etched away material just below the mask and the opening. The depth of the holes may therefore be designed via the area of the opening with due consideration to the etch process applied.

In one embodiment the pitch between openings in the mask corresponds to the pitch of the resulting holes. Typically, the pitch is measured center to center, but it may, in some embodiments, be measured first edge to first edge along the z-axis. For most lithographic etches, such as RIE and wet chemical etch, it is found that the etch process is such that the etch rate along the y-axis depends on the size of the hole likely due to diffusion of the reactive products. Hence, if the dimensions of the holes are designed sufficiently small, the etch will not reach the bottom of the core layer but instead provide a hole with a depth lower than the thickness of the core layer. This depth is in one embodiment subject to process variations but the general relationship between hole size and depth is followed. For an embodiment of the RIE process, all holes larger than 4 µm by 4 µm will provide the same depth likely due to the diffusion of etch products reaching a maximum. Accordingly, the elongated large opening corresponding to the separation of two waveguides in the middle of the grating area (see 5 in FIG. 1*b*) provides a uniform channel. As the depth of the corresponding holes is likely defined due to diffusion of etch products, the depth of the holes is related to the area of the opening. However, it is expected that the depth is also related to the minimum dimension, so that e.g. a long narrow slit opening may, in one embodiment, have a reduced depth relative to a circular opening with the same area.

In one embodiment, the openings in the mask can have, for example, 1 µm length (along the z-axis) by 1 µm width (along the x-axis). However, various hole sizes are feasible, so that, in one embodiment the mask comprises openings having an area less than 16 µm², such as less than 10 µm², such as less than 8 µm², such as less than 5 µm², such as less than 3 µm², such as less than 2 µm², such as less than 1 µm². In one embodiment, the mask comprises openings having a minimum dimension of less than 10 µm, such as less than 6 µm, such as less than 5 µm, such as less than 4 µm, such as less than 3 µm, such as less than 2 µm, such as less than 1 µm, such as less than 0.5 µm. In one embodiment the mask comprises openings having a maximum dimension of less than 10 µm, such as less than 6 µm, such as less than 5 µm, such as less than 4 µm, such as less than 3 µm, such as less than 2 µm, such as less than 1 µm, such as less than 0.5 µm.

As seen in the embodiments corresponding FIGS. 5*a*, 11 and 14*a*, holes may be connected. In one embodiment, connected holes are formed by closely spaced openings in the mask where the barrier between the openings is so thin that intermediate material (in this case core material) underneath the barrier is removed during etching. In one embodiment, connected holes are provided when the barrier of mask material between the corresponding openings is less than 2 µm, such as less than 1.75 µm, such as less than 1.5 µm, such as less than 1.25 µm, such as less than 1 µm, such as less than 0.75 µm, such as less than 0.5 µm, such as less than 0.25 µm. The result is, in one embodiment, a ridge-like shape of core material separating the individual holes but not reaching the top of the core layer (see e.g. FIGS. 5*c*, 6 and 14*b*). In one embodiment two or more openings on the mask are connected, i.e. the area defining the opening is not completely enclosed by mask material (e.g. chrome). Two connected openings are in one embodiment distinguished from a single opening by the formation of two connected, but distinct holes (see e.g. FIG. 14*b*). In one embodiment, two connected openings are distinguished from a single opening by resulting holes each having a maximum depth which is less than the depth of a hole provided by a circular area having an area corresponding to the area of the combined connected openings.

In the event that the holes formed by the connected enclosures share the minimum height in the (x,z)-plane underneath the enclosures, the connected holes are instead referred to a single hole.

In one embodiment, two connected holes are formed by two (at least partial) enclosures in the mask where the (at least partial) barrier between the holes is sufficient to provide residual core material underneath the top of the core layer between the holes. In one embodiment, the residual material forms a ridge or partial wall separating the two holes (see 17 in FIG. 5*c*). In one embodiment, the residual core at the ridge has a height 23 that is at least higher than the height of the highest adjacent height of the hole 22 by 2% of the core layer thickness, such as higher by at least 4%, such as higher by at least 6%, such as higher by at least 8%, such as higher by at least 10%, such as higher by at least 15% such as higher by at least 20% of the core layer thickness. Here, the height of the hole 22 is the difference between the height of the core/intermediate material layer (or thickness) and the depth of the hole as defined earlier. The height of the ridge is defined as the maximum y value between two adjacent holes on a center line with equal distance to the branching channel waveguides (axis C on FIGS. 3*a* and 5*a*). The height of the ridge is relative to the bottom of the core layer, but this is also defined as the zero value of the axis y.

Some preferred embodiments have been shown in the foregoing, but it should be stressed that the invention is not limited to these, but may be embodied in other ways within the subject-matter defined in the following claims.

The invention claimed is:
1. A planar optical branching device comprising:
 a. a planar top cladding layer formed by a top cladding material;
 b. a planar lower cladding layer formed by a lower cladding material;
 c. a planar core layer immediately between said top cladding and lower cladding layers, wherein waveguides are formed by core material limited by cladding material; and
 d. a pair of branching channel waveguides in said core layer branching from a main waveguide defining between them an intermediate region, a z-axis extending along the direction of light propagation of the combined light distribution in said waveguides, an x-axis extending transverse to the z-axis and in a plane of the planar optical branching device, and a y-axis extending normal to the plane of the planar optical branching device, wherein said intermediate region comprises a plurality of holes of cladding material extending from the top of the core layer into intermediate material and in a direction parallel to the y-axis, said holes having a pitch defined as the center to center distance between two holes along said z-axis, said holes being arranged so that the depth of said holes in the direction parallel to the y-axis increases away from said main waveguide with an average slope as a function of distance from said main waveguide of less than 10% over at least 30% of said intermediate region.

2. The device according to claim 1, wherein said average slope is less than or equal to 4%.

3. The device of claim 1 wherein said intermediate material is core material.

4. The device of claim 1 where said average slope over the entire intermediate region is less than 10%.

5. The device of claim 1 where the branching channel waveguides define a center line with equal distance to said branching channel waveguides along which the thickness of intermediate material varies substantially step-wise as a function of the distance from the main waveguide so that the depth of each step from the top of the core layer increases with an average slope of less than 10% as a function of distance to the main waveguide, from said main waveguide to the end of said intermediate region.

6. The device of claim 1 wherein the depth of said holes are substantially proportional to the area of said holes at the interface between top cladding layer and core layer, i.e. the hole area as seen from above.

7. The device of claim 1 wherein the holes are arranged with a center to center pitch along a center line with equal distance to said branching channel waveguides, said center to center pitch being less than 10 microns over more than 80% of the intermediate region.

8. The device of claim 7 wherein said center to center pitch is substantially constant as a function of distance to the main waveguide.

9. The device of claim 1 wherein at least 20% of said holes are connected by cladding in the core layer with the adjacent holes.

10. The device of claim 1 wherein said main waveguide is a slab waveguide of an Arrayed Waveguide Grating (AWG).

11. The device of claim 1 wherein said main waveguide and branching channel waveguides form a Y-splitter.

12. The device of claim 1 wherein said holes comprise multiple holes laid out along the x-axis in said intermediate region between said pair of branching channel waveguides.

13. The device of claim 1 wherein said intermediate region comprises 30 or more holes.

14. The device of claim 1 wherein at least 50% of the holes of the intermediate region are shorter along the z-axis than the maximum feature length.

15. The device of claim 1 wherein a percentage of the holes of the intermediate regions along the z-axis are no more than 3 times longer than the maximum feature length and said percentage is 10% or more.

16. The device of claim 15 where the maximum feature length is estimated as the maximum length of an interruption of length Z in the direction of the z-axis for which the mode mismatch loss when the mode re-enters the waveguide after the interruption is below a threshold, the maximum feature length being determined from $$z = \frac{\pi n w_1^2}{\lambda} \sqrt{\left(\frac{W_1}{w_1}\right)^2 - 1}$$

where z is the maximum feature length in z, i.e. the direction of propagation, n is the refractive index of the material, $w_1$ is the initial spot size of the field i.e. the radial distance from the center at which the electric field becomes 1/e of the peak value, X is the wavelength, and $W_1$ is the spot size of the field at the end of the interruption of length Z;

with a threshold loss of less than −0.002 dB.

17. The device claim 1 wherein said holes comprises holes having length along the z-axis of 8 µm or less.

18. The device of claim 1 wherein said holes comprises holes having width along the x-axis of 8 µm or less.

19. The device of claim 1 wherein said holes comprise holes having a width along the x-axis that increases with distance to the main waveguide by 0.3 µm or more.

20. The device of claim 1 wherein said holes comprises holes having a ratio of largest length along the z-axis to the largest width along the x-axis (zmax/xmax) less than or equal to 0.7.

21. The device of claim 1 wherein at least one of said branching waveguides has a width which tapers up as a function of distance from the main waveguide along the intermediate region.

22. The device of claim 1 wherein at least one of said branching waveguides has a width which tapers down as a function of distance from the main waveguide substantially immediately following the intermediate region to a width reduced by more than 10%.

23. The device of claim 1 comprising three or more channel waveguides and two or more intermediate regions comprising holes having a pitch adjacent to the main waveguide wherein one or more said intermediate regions are shifted in the z-axis by more than 25% of the pitch with respect to other intermediate regions.

24. The device of claim 1 wherein one or more of said holes are obtainable via a lithographic etch process using a mask, said mask arranged to provide said hole via an opening area of less than 16 µm2 where the minimum dimension (x or z) is less than 2 µm.

25. A planar optical branching device comprising:
 a. a planar top cladding layer formed by a top cladding material;
 b. a planar lower cladding layer formed by a lower cladding material;
 c. a planar core layer immediately between said top cladding and lower cladding layers, wherein waveguides are formed by core material limited by cladding material; and
 d. a pair of branching channel waveguides in said core layer branching from a main waveguide defining between them an intermediate region, a z-axis extending along the direction of light propagation of the combined light distribution in said waveguides, an x-axis extending transverse to the z-axis and in a plane of the planar optical branching device, and a y-axis extending normal to the plane of the planar optical branching device,
 wherein said intermediate region comprises a plurality of holes of cladding material extending from the top of the core layer into intermediate material and in a direction parallel to the y-axis, said holes having a pitch defined as the center to center distance between two holes along said z-axis, said holes being arranged so that the depth of said holes in the direction parallel to the y-axis increases away from said main waveguide with an average slope as a function of distance from said main waveguide and wherein at least two or more of said holes are connected.

26. The device of claim 25 wherein two or more of said connected holes are separated by a partial wall or ridge of residual intermediate material having a minimum height at least 5% larger than the hole depth.

27. A planar optical branching device comprising
   a. a planar top cladding layer formed by a top cladding material;
   b. a planar lower cladding layer formed by a lower cladding material;
   c. a planar core layer immediately between said top cladding and lower cladding layers, wherein waveguides are formed by core material limited by cladding material; and
   d. a pair of branching channel waveguides in said core layer branching from a main waveguide defining between them an intermediate region ranging from said main waveguide to when the branching waveguides are completely separated by cladding material in the core layer, a z-axis extending along the direction of light propagation of the combined light distribution in said waveguides, an x-axis extending transverse to the z-axis and in a plane of the planar optical branching device, and a y-axis extending normal to the plane of the planar optical branching device,
wherein said intermediate region comprises a plurality of holes of cladding material extending from the top of the core layer into intermediate material and in a direction parallel to the y-axis, said holes being arranged so that the depth of said holes in the direction parallel to the y-axis increases away from said main waveguide with an average slope as a function of distance from said main waveguide with a center to center pitch along a center line with equal distance to said branching channel waveguides, said center to center pitch being less than 10 microns over more than 80% of the intermediate region.

28. The device of claim 1 wherein the holes are arranged with a center to center pitch along a center line with equal distance to said branching channel waveguides, said center to center pitch being less than 10 microns over more than 80% of the intermediate region wherein at least 20% of said holes are connected by cladding in the core layer with the adjacent holes.

29. The device of claim 1 wherein said intermediate region comprises 40 or more holes.

30. The device of claim 1 wherein said intermediate region ranges from said main waveguide to when the branching waveguides are completely separated by cladding material in the core layer.

31. The device of claim 25 wherein said intermediate region ranging from said main waveguide to 700 μm away from the branching point along the z-axis.

32. The device of claim 16, wherein the threshold loss is −0.001 dB or less.

* * * * *